United States Patent
Harrison et al.

(10) Patent No.: US 12,464,559 B2
(45) Date of Patent: Nov. 4, 2025

(54) WIRELESS DEVICE, A NETWORK NODE, AND METHODS THEREIN FOR DETERMINING AN IDENTITY OF A WIRELESS DEVICE DURING A RANDOM ACCESS PROCEDURE

(71) Applicant: Telefonaktiebolaget LM Ericsson (publ), Stockholm (SE)

(72) Inventors: Robert Mark Harrison, Grapevine, TX (US); Jan Christoffersson, Luleå (SE); Zhipeng Lin, Nanjing (CN); Johan Rune, Lidingö (SE); Henrik Enbuske, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 820 days.

(21) Appl. No.: 17/770,545

(22) PCT Filed: Nov. 5, 2020

(86) PCT No.: PCT/SE2020/051060
§ 371 (c)(1),
(2) Date: Apr. 20, 2022

(87) PCT Pub. No.: WO2021/091461
PCT Pub. Date: May 14, 2021

(65) Prior Publication Data
US 2022/0394776 A1 Dec. 8, 2022

Related U.S. Application Data

(60) Provisional application No. 62/931,894, filed on Nov. 7, 2019.

(51) Int. Cl.
*H04W 74/00* (2009.01)
*H04W 74/0833* (2024.01)

(52) U.S. Cl.
CPC ..... *H04W 74/0833* (2013.01); *H04W 74/002* (2013.01)

(58) Field of Classification Search
CPC ........... H04W 74/0833; H04W 74/002; H04W 74/0836; H04W 74/0838; H04W 74/004; H04W 8/26
See application file for complete search history.

(56) References Cited

U.S. PATENT DOCUMENTS

| | | | |
|---|---|---|---|
| 2021/0105813 A1* | 4/2021 | Lee | H04W 74/0833 |
| 2022/0132591 A1* | 4/2022 | Agiwal | H04W 74/0836 |
| 2023/0328802 A1* | 10/2023 | Yao | H04W 72/232 |

FOREIGN PATENT DOCUMENTS

| | | |
|---|---|---|
| WO | 2020166899 A1 | 8/2020 |
| WO | 2020191584 A1 | 10/2020 |

OTHER PUBLICATIONS

Fujitsu ("Considerations on MsgB reception", 3GPP Draft; R2-1913168, 3rd Generation Partnership Project (3GPP), Oct. 2019(Oct. 4, 2019)).*

(Continued)

*Primary Examiner* — Lakeram Jangbahadur
(74) *Attorney, Agent, or Firm* — Weisberg I.P. Law, P.A.

(57) ABSTRACT

A method performed by a wireless device for determining an identity of the wireless device, MsgB RNTI, in a wireless communications network during a random access procedure is provided. The wireless device transmits a random access preamble on a RACH at a random access occasion. It also transmits a message on a PUSCH that corresponds to the random access preamble. Further, the wireless device determines an MsgB RNTI as the sum of a first identity, RA-RNTI, and an offset that is an integer greater than 1, wherein the RA-RNTI is based on a sum comprising terms corresponding to at least the index of a first OFDM symbol, the (Continued)

index of a frequency resource, and the index of a first time slot that identifies the time/frequency resources of the random access occasion.

14 Claims, 14 Drawing Sheets

(56) References Cited

OTHER PUBLICATIONS

3GPP (3rd Generation Partnership Project; Technical Specification Group Radio Access Network; NR; Medium Access Control (MAC) protocol) Specification; 3GPP TS 38.321, 3rd Generation Partnership Project (3GPP), vol. RAN WG2, No. V15.7.0 Sep. 27, 2019 (Sep. 27, 2019).*
3GPP TSG RAN WG1 Meeting #98bis R1-1910575; Title: Discussion on 2-step RACH Procedure; Agenda Item: 7.2.1.2; Source: LG Electronics; Document for: Discussion and Decision; Date and Location: Oct. 14-18, 2019, Chongqing, China; consisting of 25 pages.
International Search Report and Written Opinion dated Feb. 8, 2021 for International Application No. PCT/SE2020/051060 filed Nov. 5, 2020; consisting of 14 pages.
3GPP TSG-RAN WG2 Meeting #107bis R2-1913168; Title: Considerations on MsgB reception; Agenda Item: 6.13.2; Source: Fujitsu; Document for: Discussion and Decision; Date and Location: Oct. 14-18, 2019, Chongqing, China; consisting of 5 pages.
3GPP TSG RAN WG1 Meeting #96 R1-1901627; Title: Considerations on 2-Step RACH Procedures; Source: ZTE, Sanechips; Agenda Item: 7.2.1.2; Document for: Discussion; Date and Location: Feb. 25-Mar. 1, 2019, Athens, Greece; consisting of 11 pages.
3GPP TSG RAN WG1 #98bis R1-1911659; Title: Feature lead summary#7 on 2 step RACH procedures; Agenda Item: 7.2.1.2; Source: Nokia, Nokia Shanghai Bell; Document for: Discussion and Decision; Date and Location: Oct. 14-18, 2019, Chongqing, China; consisting of 65 pages.
3GPP TS 38.211 V15.7.0; 3rd Generation Partnership Project; Technical Specification Group Radio Access Network; NR; Physical channels and modulation (Release 15); Sep. 2019; consisting of 97 pages.
3GPP TS 38.321 V15.7.0; 3rd Generation Partnership Project; Technical Specification Group Radio Access Network; NR; Medium Access Control (MAC) protocol specification (Release 15); Sep. 2019; consisting of 78 pages.

* cited by examiner

| | | | | | | | |
|---|---|---|---|---|---|---|---|

| R | Timing Advance Command | Oct 1 |
|---|---|---|
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

WIRELESS DEVICE, A NETWORK NODE, AND METHODS THEREIN FOR DETERMINING AN IDENTITY OF A WIRELESS DEVICE DURING A RANDOM ACCESS PROCEDURE

CROSS-REFERENCE TO RELATED APPLICATIONS

This application is a Submission Under 35 U.S.C. § 371 for U.S. National Stage Patent Application of International Application No.: PCT/SE2020/051060, filed Nov. 5, 2020 entitled "A WIRELESS DEVICE, A NETWORK NODE, AND METHODS THEREIN FOR DETERMINING AN IDENTITY OF A WIRELESS DEVICE DURING A RANDOM ACCESS PROCEDURE," which claims priority to U.S. Provisional Application No.: 62/931,894, filed Nov. 7, 2019, the entireties of both of which are incorporated herein by reference.

TECHNICAL FIELD

Embodiments herein relate to random access in a wireless communications network. In particular, embodiments herein relate to a wireless device and a method therein for determining an identity of the wireless device in a wireless communications network during a random access procedure. Also, embodiments herein relate to a network node and a method therein for determining an identity of the wireless device in a wireless communications network during a random access procedure. Furthermore, the embodiments herein relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

FIG. 1 describes a 4-step initial approach of a Random Access, RA, procedure, or Random Access Channel, RACH, procedure. In this approach, the UE may in Action 101a detect a Synchronization Signal, SS. This may, for example, be a SSB or SS-block comprising a New Radio Primary SS, NR PSS, a NR Secondary SS, NR SSS, and a NR Physical Broadcast Channel, NR PBCH. In Action 101b, the UE may decode the broadcasted system information, such as, e.g. NR Remaining Minimum System Information, RMSI, and Other System Information, OSI. This may be followed in Action 102 by transmitting a Physical RACH, PRACH, preamble in the uplink, e.g. NR-PRACH. This PRACH preamble message may also be referred to as message 1 or Msg1. In Action 103, the gNB may reply with a Random Access Response, RAR, e.g. NR-RAR. This RAR message may also be referred to as message 2 or Msg2. The UE may then in Action 104 transmit a UE identification on a PUSCH, Physical Uplink Shared Channel. The UE transmits PUSCH, also referred to as message 3 or Msg3, after receiving a timing advance command in the RAR, allowing PUSCH to be received with a timing accuracy within the cyclic prefix. Without this timing advance, a very large Cyclic Prefix, CP, would be needed in order to be able to demodulate and detect PUSCH, unless the system is applied in a cell with very small distance between UE and gNB. Since NR will also support larger cells with a need for providing a timing advance to the UE, the 4-step approach is needed for the random access procedure. Also, in Action 105, the gNB may transmit a Contention Resolution Message, CRM, to the UE. In this 4-step approach of a random access procedure, a SSB to preamble mapping was introduced for the gNB to know the SSB index of an SSB with a high downlink quality as measured by the UE, via the preamble from this UE.

According to one example, the gNB may configure the following in RMSI:

1) #SSBs-per-PRACH-occasion may be ⅛, ¼, ½, 1, 2, 4, 8, or 16, which is the number of SSBs that are mapped to each PRACH occasion and wherein values <1 means one SSB maps to multiple consecutive PRACH occasions.

2) #CB-preambles-per-SSB, i.e. this is the number of Contention Based, CB, preambles per SSB per PRACH occasion, wherein:

If #SSBs-per-PRACH-occasion E {⅛, ¼, ½, 1, 2}, then #CB-preambles-per-SSB is selected from the set of values 4*N, with N=1, . . . , floor(16/max(1, #SSBs-per-PRACH-occasion));

If #SSBs-per-PRACH-occasion E {4, 8, 16}, then #CB-preambles-per-SSB is selected from the set of values N, with N=1, . . . , floor(64/#SSBs-per-PRACH-occasion).

3) Preamble indices for Contention Based RA, CBRA, and Contention Free RA, CFRA, are mapped (associated) consecutively for one SSB in one PRACH occasion:

For the case that N SSBs are associated with one PRACH occasion, where N>=1, the subset of #CB-preambles-per-SSB consecutive CBRA preambles associated with SSB i (i=0, . . . , N−1) starts from preamble index i*(totalNumberOfRA-Preambles/N).

Association of CFRA preambles with SSBs may be reconfigured through UE-specific RRC signalling.

FIG. 2 shows one example where #SSBs-per-PRACH-occasion=4, #CB-preambles-per-SSB=4, and totally 64 preamble indices are configured in the cell (per PRACH occasion) with 16 preamble indices used for CBRA. Here, it may be seen e.g. that the first 16 preamble indices are mapped to SSB 0.

Radio Network Temporary Identifier (RNTI) of message 2 and message 3 in NR Rel 15

The RA-RNTI is used for UEs for Msg 2 transmission except for contention-free Random Access Preamble for beam failure recovery request where a Cell RNTI, C-RNTI, is used.

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id <80), f_id is the index of the PRACH occasion in the frequency domain (0≤f_id<8), and ul_carrier_id is the UL carrier used for Random Access Preamble transmission (0 for NUL carrier, and 1 for SUL carrier).

It may be observed that the values of RA-RNTI range from 1 to at most 1+13*14*79+14*80*7+14*80*8=17920. However, all of the 17,920 values may not be used according to the RACH configuration used. This may, for example, be the case when fewer slots than 80 are occupied by ROs in a system frame, when fewer than 8 ROs are multiplexed in the frequency domain, or when a Supplementary UL, SUL, carrier is not configured, etc. A UE may transmit a transport block in a Msg3 PUSCH scheduled by a RAR UL grant in a corresponding RAR message using redundancy version number 0. Retransmissions, if any, of the transport block in a Msg3 PUSCH are scheduled by a Downlink Control Information, DCI, format 0_0 with a Cyclic Redundancy Check, CRC, scrambled by a TC-RNTI provided in the corresponding RAR message. The UE always transmits an Msg3 PUSCH without repetitions.

In the standard document 3GPP 38.321, the range of RNTI values are defined according to Table 1:

TABLE 1

| Value (hexa-decimal) | RNTI |
| --- | --- |
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFD | Reserved |
| FFFE | P-RNTI |
| FFFF | SI-RNTI |

From Table 1, it may be observed that there are a variety of types of RNTI that share the range of values 0001-FFEF. Most RNTI types such as C-RNTI, SP-CSI-RNTI, CS-RNTI, TPC-SRS-RNTI, TPC-PUCCH-RNTI, and TPC-PUSCH-RNTI are assigned by the network using higher layer signalling, and therefore change relatively infrequently. However, RA-RNTI is calculated by the UE and depends on the location of the RACH occasion in time and frequency. Therefore, in the wireless communication network, slowly changing RNTIs such as C-RNTI should be assigned values that are different from values that may be determined for RA-RNTI. FIG. 3 shows an example of a MAC RAR which is octet aligned and provides the Temporary C-RNTI, TC-RNTI, to be used for the message 3 and message 4.

2-Step RACH Work Item for Release 16 in 3GPP

FIG. 4 describes a 2-step initial approach of a random access procedure, or RACH procedure. Actions 401a-401b are similar to the corresponding actions 101a-101b described in FIG. 1. In this approach, the UE may in Action 402a send a message A or Msg A comprising a random access preamble. This Msg A transmission may be performed together with the transmission of higher layer data, such as, a RRC connection request possibly with some small payload on PUSCH in Action 402b. Then, the gNB may in Action 403 send a response message called message B or MsgB comprising, for example, a UE identifier assignment, timing advance information, and contention resolution message, etc. Regarding the RNTI to be used for MsgB, hereinafter referred to as the MsgB RNTI, one issue is how to differentiate MsgB in FIG. 4 from Msg2 in FIG. 1. According to one option, a new RA-RNTI for MsgB RA-RNTI may be used. Another option is to use a reinterpretation of a reserved field in DCI format 1_0 for scheduling MsgB. A further option is to use an explicit/implicit indication in MAC layer for MsgB or msg2 multiplexed in one PDSCH. Yet a further option is that the UE distinguishes the fallback RAR and MsgB by different time/frequency resources.

SUMMARY

It is an object of embodiments herein to improve the determination of identities of wireless devices in a wireless communications network.

According to a first aspect of embodiments herein, the object is achieved by a method performed by a wireless device for determining an identity of the wireless device, MsgB RNTI, in a wireless communications network during a random access procedure. The wireless device transmits a random access preamble on a Random Access Channel, RACH, at a random access occasion, wherein the time/frequency resources of the random access occasion are identified by at least an index of a first OFDM symbol, an index of a frequency resource, and an index of a first time slot. Also, the wireless device transmits a message on a Physical Uplink Shared Channel, PUSCH, that corresponds to the random access preamble. Further, the wireless device determines an identity of the wireless device, MsgB RNTI, as the sum of a first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion.

According to a second aspect of embodiments herein, the object is achieved by a wireless device for determining an identity of the wireless device, MsgB RNTI, in a wireless communications network during a random access procedure. The wireless device comprises a processing circuitry configured to transmit a random access preamble on a Random Access Channel, RACH, at a random access occasion, wherein the time/frequency resources of the random access occasion are identified by at least an index of a first OFDM symbol, an index of a frequency resource, and an index of a first time slot. The processing circuitry is also configured to transmit a message on a Physical Uplink Shared Channel, PUSCH, that corresponds to the random access preamble. Further, the processing circuitry is configured to determine an identity of the wireless device, MsgB RNTI, as the sum of the first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion.

According to a third aspect of embodiments herein, the object is achieved by a method performed by a network node for determining an identity of a wireless device, MsgB RNTI, in a wireless communications network during a random access procedure. The network node receives a random access preamble on a Random Access Channel, RACH, at a random access occasion, wherein the time/frequency resources of the random access occasion are identified by at least an index of a first OFDM symbol, an index of a frequency resource, and an index of a first time slot. Also, the network node receives a message on a Physical Uplink Shared Channel, PUSCH, that corresponds to the random access preamble. Further, the network node determines an identity of the wireless device, MsgB RNTI, as the sum of the first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion.

According to a fourth aspect of embodiments herein, the object is achieved by a network node for determining an identity of a wireless device, MsgB RNTI, in a wireless communications network during a random access procedure. The network node comprises processing circuitry configured to receive a random access preamble on a Random Access Channel, RACH, at a random access occasion, wherein the time/frequency resources of the random access occasion are identified by at least an index of a first OFDM symbol, an index of a frequency resource, and an index of a first time slot. The processing circuitry is also configured to receive a message on a Physical Uplink Shared Channel, PUSCH, that corresponds to the random access preamble. Further, the processing circuitry is configured to determine an identity of the wireless device, MsgB RNTI, as the sum of the first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion.

According to a fifth aspect of the embodiments herein, a computer program is also provided configured to perform the method described above. Further, according to a sixth aspect of the embodiments herein, carriers are also provided configured to carry the computer program configured for performing the method described above.

By adding an offset that is an integer greater than 1 to a first identity, RA-RNTI, so as to determine an identity of the wireless device, MsgB RNTI, to be used in a random access procedure, a 2-step random access procedure is enabled in which the identity of the wireless device, MsgB RNTI, is clearly differentiated from the identity of the wireless device, RA-RNTI, used in a conventional Msg2 of a 4-step random access procedure. In other words, in this way, RNTIs specific to MsgB may be used in the 2-step random access procedure. Hence, the determination of identities of wireless devices in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
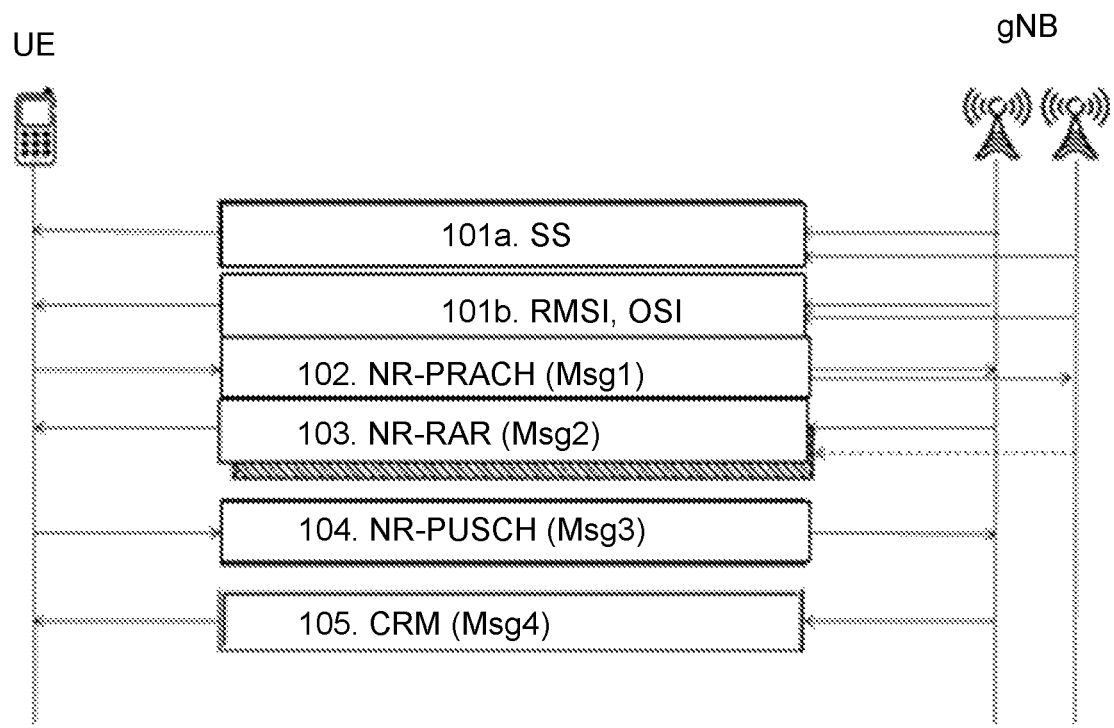
FIG. 1 is schematic diagram of a Random Access Channel, RACH, procedure between a network node and a wireless device in a wireless communications network.
Figure 2:
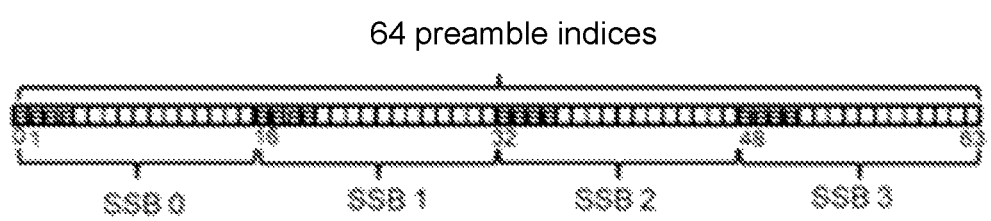
FIG. 2 is a schematic illustration of a mapping between a Synchronization Signal Block, SSB, and a preamble.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives features and advantages of the enclosed embodiments will be apparent from the following description.

The figures are schematic and simplified for clarity, and they merely show details which are essential to the understanding of the embodiments presented herein, while other details have been left out. Throughout, the same reference numerals are used for identical or corresponding parts or steps.

Figure 5:
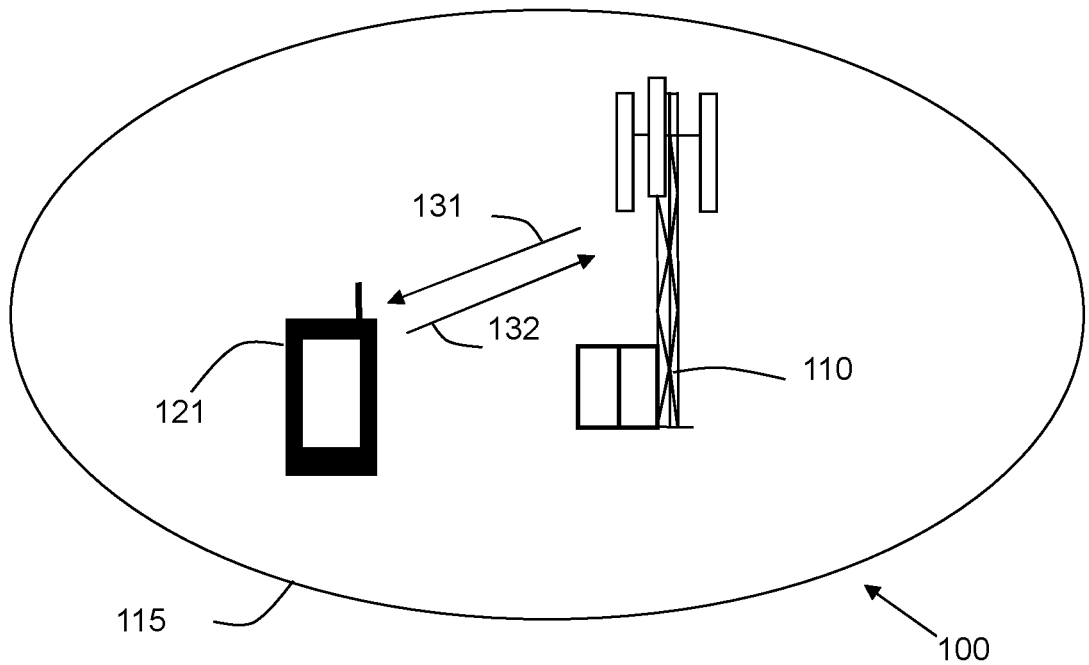
FIG. 5 is a schematic illustration of a wireless communications network in accordance with some embodiments.

FIG. 5 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, a first wireless device 121 is located within the cell 115. The first wireless device 121 is configured to communicate within the wireless communications network 100 via the network node 110 over a radio link served by the network node 110. The first wireless devices 121 may transmit data over an air or radio interface to the radio base station 110 in uplink, UL, transmissions 131 and the radio base station may transmit data over an air or radio interface to the first wireless device 121 in downlink, DL, transmissions 132. The first wireless devices 121 may refer to any type of wireless devices or user equipments (UEs) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication.

As part of the developing of the embodiments described herein, it has been realized that there currently exist certain challenges regarding determining identities of wireless devices in wireless communications networks during a random access procedure. Namely, that it is necessary to differentiate MsgB in 2-step RA and msg2 in 4-step RA.

However, how these RNTIs are calculated and how they differ from earlier RA-RNTIs, such as, Rel-15 RA-RNTIs, has not yet been determined. Some MsgB RNTI designs may use separate RNTIs for MsgB than for RA-RNTI, such as, for example, by setting the most significant bit of the calculated RA-RNTI to 1. While presenting a low complexity solution, such designs may result in that twice the number of RNTI values is needed. According to some embodiments herein, an even more low complexity solution may be provided by having additional RNTIs specific to MsgB which may be used for this purpose, such as, adding an offset to the current calculation of the RA-RNTI to determine a MsgB RNTI, such as, e.g. 17920 or higher.

It may sometimes be desirable to assign values above 17920 for slowly changing RNTIs, such as, e.g. C-RNTI. Therefore, assigning MsgB RNTIs in this space reduces the number of favorable RNTIs available for C-RNTIs. Furthermore, RNTIs that use the Rel-15 RA-RNTI formula vary across cells, and so if MsgB RNTIs are based on a same or similar formula as Rel-15 RA-RNTI, there may be few values available for C-RNTI. Since there are many different types of RNTI in addition to C-RNTI that are assigned for long periods of time such as CS-RNTI, SP-CSI-RNTI, and it may be desirable to use these same RNTIs on different cells, e.g. in carrier aggregation, these RNTI values may also preferably be assigned above 17920, further limiting the amount of RNTIs available for any one of these different types. One solution presented in the standard document 3GPP R1-1910575 suggest that MsgB RA-RNTI may be determined by adding an offset value of 1 to the starting OFDM symbol of RO in the existing formula of RA-RNTI. However, while this uses values less than 17920, it does not support where more than one RNTI value corresponds to each RACH occasion. Therefore, it does not provide a clear differentiation of identities for the MsgB in the 2-step RA and the Msg2 in the 4-step RA.

Certain aspects of the present disclosure and their embodiments may provide solutions to these or other challenges. Some embodiments herein describe mechanisms to calculate MsgB RNTIs that are distinct from RA-RNTI and, in some cases, limits the number of new RNTI values for MsgB that are different from RA-RNTI. A first such mechanism may be modifying the Rel-15 RA-RNTI calculation to add an offset derived from the transmitted preamble index such that more than one MsgB RNTI may map to a RACH occasion. Here, the offset may, for example, be calculated as preamble_id mod N_offset, where N_offset is configurable or set according to the length of the preamble in symbols. A second such mechanism may be modifying the Rel-15 RA-RNTI calculation to add a configurable offset to one or more indices used in the RA-RNTI calculation according to the following equation, Eq. 1: MsgB RNTI=1+(s_id+s_offset)+14×(t_id+t_offset)+14×80×(f_id+f_offset)+14×80×8×ul_carrier_id. In some embodiments, a symbol offset ('s_offset') in the equation below can be configured to be a value of 1 and optionally set to zero when not used. In some embodiments, a time offset ('t_offset') in the equation below can be configured to be a value of 1 up to 79 and optionally set to zero when not used. In some embodiments, a frequency offset ('f_offset') in the equation below can be configured to be a value of 1 up to 7 and optionally set to zero when not used. A third such mechanism may be introducing a separate numbering of PRACH occasions (RO) for a MsgB RNTI and removing all resulting MsgB RNTIs that collide with the RA-RNTIs of the used 4-step RACH configuration. In some embodiments, the separate numbering is consecutive (all integers) starting from 1, over a PRACH configuration period, SFN or multiple of SFNs. A fourth such mechanism may be using Rel-15 RA-RNTI as MsgB RNTI when RACH occasions are separately configured for 2-step and 4-step operation.

It should also be noted that, for example, as may be seen in the background above, Rel-15 RA-RNTI will fall in the range 1-17920, but does not necessarily occupy all values in this range. This implies that it may be possible to assign a UE a value of, for example, C-RNTI within the range of 1-17920 that is not used by RA-RNTI. However, RA-RNTI only corresponds to the RACH occasion used by the UE for random access. Each cell can have a different RACH configuration, and so the set of values used by RA-RNTI can be different on different cells. A UE can be scheduled by different cells, for example in carrier aggregation, and so RNTIs used for scheduling in these different cells such as C-RNTI should not conflict with the range of RA-RNTI present on all cells that can schedule the UE. This implicates that the values above 17920 are more suitable for slowly changing RNTIs such as C-RNTI unless RACH configurations within the network are such that no cell in the network uses a subset of values below 17920.

Figure 6:
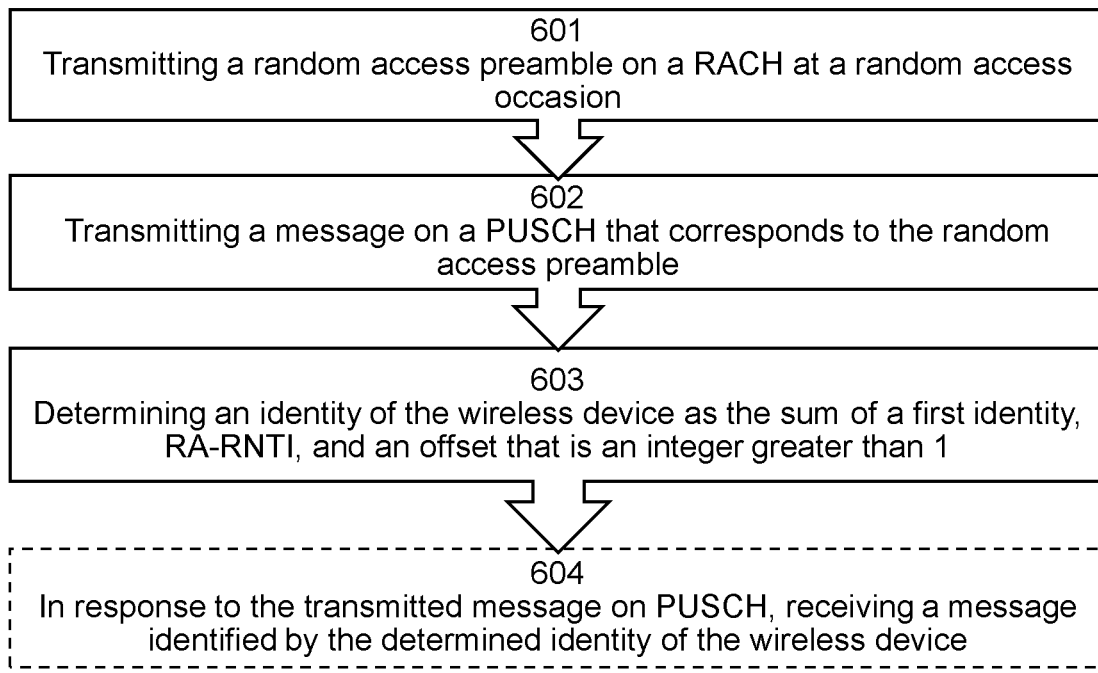
FIG. 6 is a flowchart depicting embodiments of methods in a wireless device.

Examples of embodiments of a method performed by a wireless device 121 for determining an identity of the wireless device 121, MsgB RNTI, in a wireless communications network 100 during a random access procedure, will now be described with reference to the flowchart depicted in FIG. 6. FIG. 6 is an illustrated example of actions or operations which may be taken by the wireless device 121 in the wireless communication network 100 described and shown in FIG. 5. The method may comprise the following actions.

Figures 3, 4:
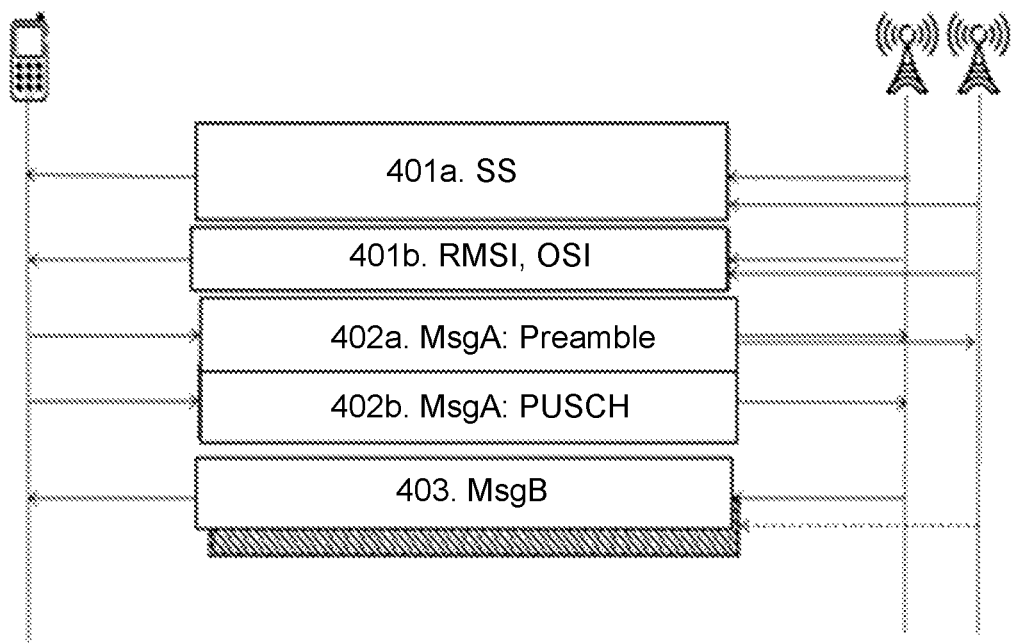
FIG. 3 is a schematic illustration of a Medium Access Control, MAC, Random Access Response, RAR.
FIG. 4 is schematic diagram of another RACH procedure between a network node and a wireless device in a wireless communications network.

Action 601. The wireless device 121 transmits a random access preamble on a Random Access Channel, RACH, at a random access occasion, wherein the time/frequency resources of the random access occasion are identified by at least an index of a first OFDM symbol, an index of a frequency resource, and an index of a first time slot. In other words, this means that the random access occasion is identified by at least a first OFDM symbol, a frequency resource, and a time slot, in which the random access preamble is transmitted. This action corresponds to the message A or Msg A in step 402a in the two-step RACH procedure shown in FIG. 4.

Action 602. After the transmission in Action 601, the wireless device 121 also transmits a message on a Physical Uplink Shared Channel, PUSCH, that corresponds to the random access preamble. This action corresponds to the message A or Msg A in step 402b in the two-step RACH procedure shown in FIG. 4.

Action 603. The wireless device 121 determines an identity of the wireless device 121, MsgB RNTI, as the sum of a first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion. This advantageously enables a 2-step random access procedure in which the identity of the wireless device, MsgB RNTI, is clearly differentiated from the identity of the wireless device, RA-RNTI, used in a conventional Msg2 of a 4-step random access procedure. In other words, in this way, RNTIs specific to MsgB may be used in the 2-step random access procedure.

According to some embodiments, the offset may be determined as a modulo division of the index associated with any of the first OFDM symbol, the frequency resource, and the time slot, that identifies the random access occasion of the transmitted random access preamble by a positive integer divisor.

In this case, according to some embodiments, the positive integer divisor may be received by the wireless device 121 using higher layer signalling and may at most be 14. Alternatively, according to some embodiments, the positive integer divisor may be determined as at least one of a duration of the random access preamble in symbols minus 1 and a number of symbols in a time slot in which the random access preamble is transmitted minus 1. According to another option, the positive integer divisor may be determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA}>0$, then the divisor is equal to $N_{dur}^{RA}-1$ and otherwise if $N_{dur}^{RA}=0$ then the divisor is equal to 13. According to another further option, the positive integer divisor may be determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum. Furthermore, in some embodiments, an additional term is added in the sum, wherein the additional term has a value of either 32,768 or 32,769.

Action 604. Optionally, in response to the transmitted message on PUSCH in Action 602, the wireless device 121 may receive a message, MsgB, identified by the determined identity of the wireless device 121, MsgB RNTI. This action corresponds to the message B or MsgB in step 403 in the two-step RACH procedure shown in FIG. 4. This response message may comprise, for example, a UE identifier assignment, timing advance information, and contention resolution message, etc.

Figure 7:
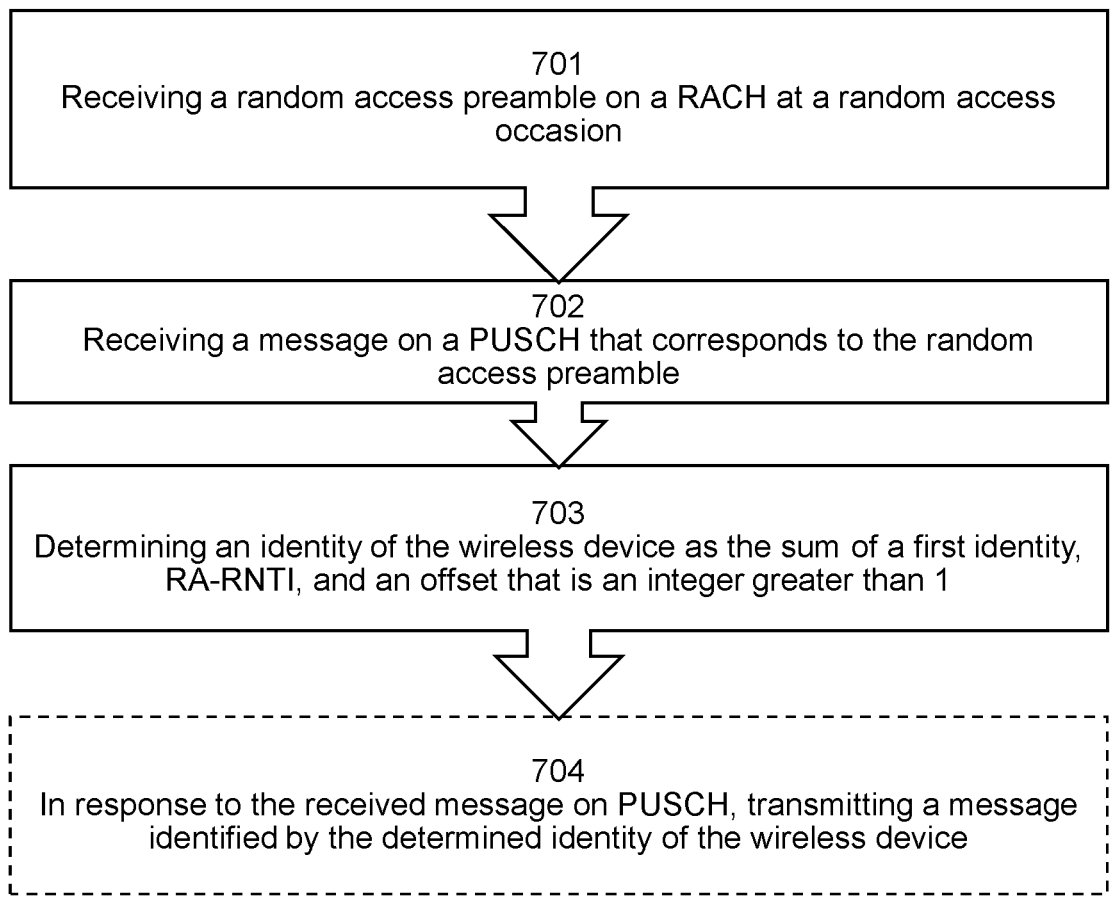
FIG. 7 is a flowchart depicting embodiments of methods in a network node.

Examples of embodiments of a method in a network node 110 for determining an identity of a wireless device 121, MsgB RNTI, in a wireless communications network 100 during a random access procedure, will now be described with reference to the flowchart depicted in FIG. 7. FIG. 7 is an illustrated example of actions or operations which may be taken by the network node 110 in the wireless communication network 100 described and shown in FIG. 5. The method may comprise the following actions.

Action 701. The network node 110 receives a random access preamble on a Random Access Channel, RACH, at a random access occasion, wherein the time/frequency resources of the random access occasion are identified by at least an index of a first OFDM symbol, an index of a frequency resource, and an index of a first time slot. In other words, this means that the random access occasion is identified by at least a first OFDM symbol, a frequency resource, and a time slot, in which the random access preamble is transmitted. This action corresponds to the message A or Msg A in step 402a in the two-step RACH procedure shown in FIG. 4.

Action 702. After the transmission in Action 701, the network node 110 also receives a message on a Physical Uplink Shared Channel, PUSCH, that corresponds to the random access preamble. This action corresponds to the message A or Msg A in step 402b in the two-step RACH procedure shown in FIG. 4.

Action 703. The network node 110 determines an identity of the wireless device 121, MsgB RNTI, as the sum of a first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion. This advantageously enables a 2-step random access procedure in which the identity of the wireless device, MsgB RNTI, is clearly differentiated from the identity of the wireless device, RA-RNTI, used in a conventional Msg2 of a 4-step random access procedure. In other words, in this way, RNTIs specific to MsgB may be used in the 2-step random access procedure.

According to some embodiments, the offset may be determined as a modulo division of the index associated with any of the first OFDM symbol, the frequency resource, and the time slot, that identifies the random access occasion of the transmitted random access preamble by a positive integer divisor.

In this case, according to some embodiments, the positive integer divisor may be received by the wireless device 121 using higher layer signalling and may at most be 14. Alternatively, according to some embodiments, the positive integer divisor may be determined as at least one of a duration of the random access preamble in symbols minus 1 and a number of symbols in a time slot in which the random access preamble is transmitted minus 1. According to another option, the positive integer divisor may be determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA}>0$, then the divisor is equal to $N_{dur}^{RA}-1$ and otherwise if $N_{dur}^{RA}=0$ then the divisor is equal to 13. According to another further option, the positive integer divisor may be determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum. Furthermore, in some embodiments, an additional term is added in the sum, wherein the additional term has a value of either 32,768 or 32,769.

Action 704. Optionally, in response to the received message on PUSCH in Action 702, the network node 110 may transmit a message, MsgB, identified by the determined identity of the wireless device 121, MsgB RNTI. This action corresponds to the message B or MsgB in step 403 in the two-step RACH procedure shown in FIG. 4. This response message may comprise, for example, a UE identifier assignment, timing advance information, and contention resolution message, etc.

Figure 8:
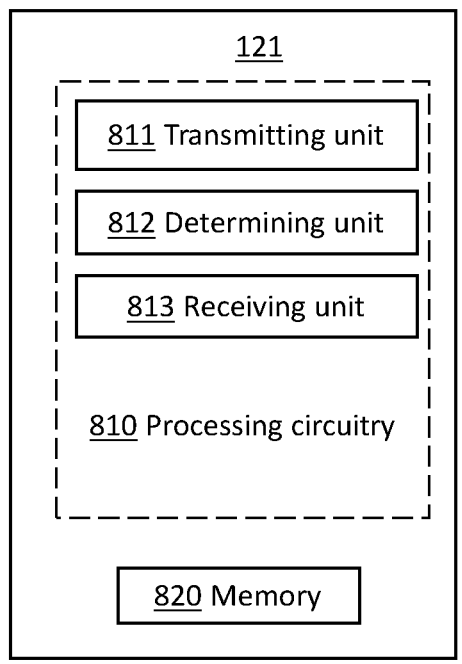
FIG. 8 is a block diagram depicting embodiments of a wireless device.

To perform the method actions in a wireless device 121 for determining an identity of the wireless device 121, MsgB RNTI, in a wireless communications network 100 during a random access procedure, the wireless device 121 may comprise the following arrangement depicted in FIG. 8. FIG. 8 shows a schematic block diagram of embodiments of a virtual apparatus 810 that may be implemented in the wireless device 121.

Figure 10:
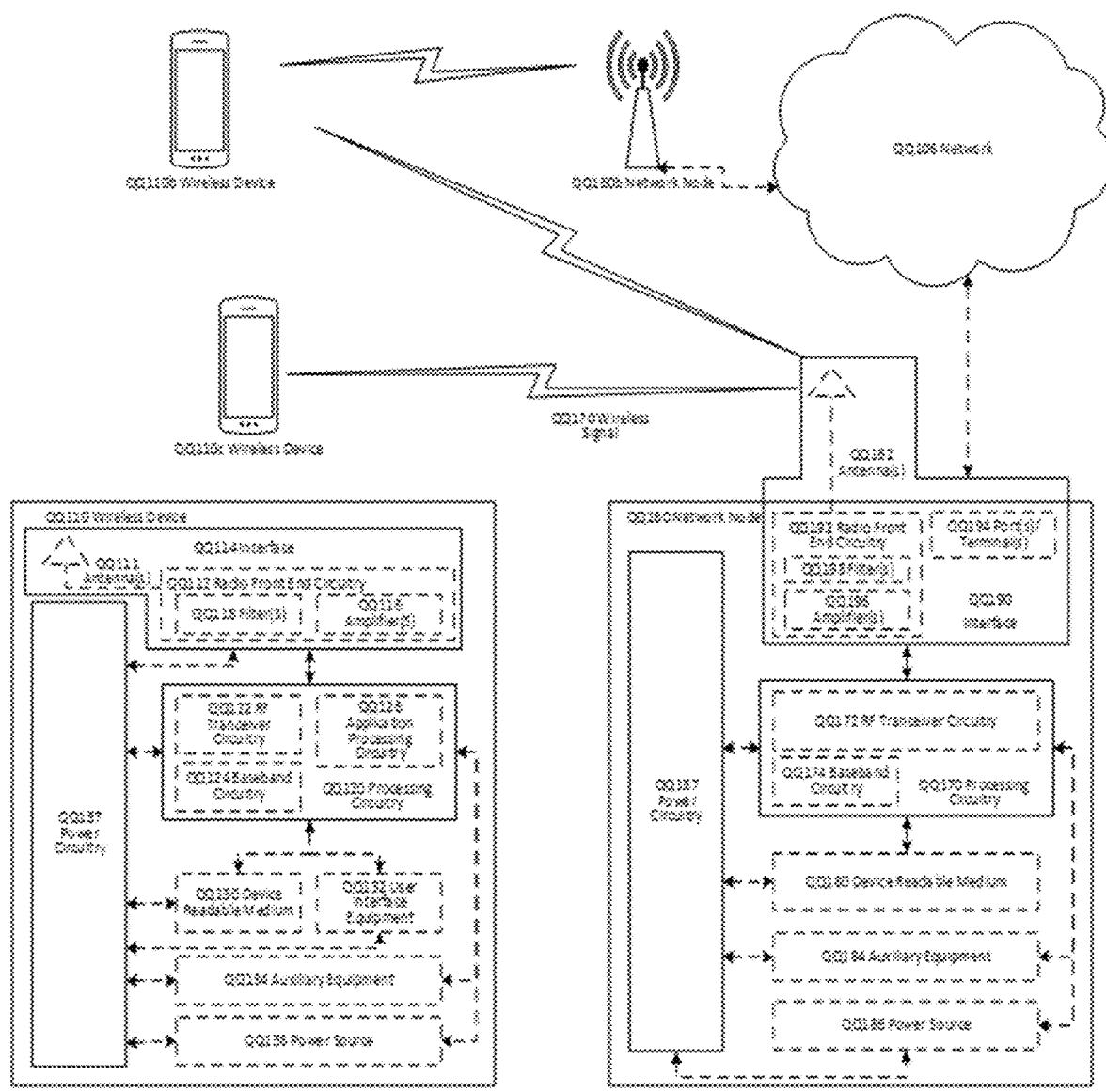
FIG. 10 is a schematic illustration of a wireless network in accordance with some embodiments.

FIG. 8 illustrates a schematic block diagram of embodiments of an apparatus 810 in a wireless communications network 100 (for example, the wireless network shown in FIG. 5 or FIG. 10). The apparatus 810 may be implemented in a wireless device 121 (e.g. the wireless device QQ110 shown in FIG. 10). Apparatus 810 is operable to carry out the example method described with reference to FIG. 6, and possibly any other processes or methods disclosed herein. It is also to be understood that the method of FIG. 6 is not necessarily carried out solely by apparatus 810. At least some operations of the method can be performed by one or more other entities.

Apparatus 810, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause an transmitting unit 811, a determining unit 812, and a receiving unit 813, and any other suitable units of apparatus 810 to perform corresponding functions according one or more embodiments of the present disclosure.

The wireless device 121 or processing circuitry therein is configured to, or may comprise the transmitting unit 811 configured to, transmit a random access preamble on a Random Access Channel, RACH, at a random access occasion, wherein the time/frequency resources of the random access occasion are identified by at least an index of a first OFDM symbol, an index of a frequency resource, and an index of a first time slot. Also, the wireless device 121 or processing circuitry therein is configured to, or may comprise the transmitting unit 811 configured to, transmit a message on a Physical Uplink Shared Channel, PUSCH, that corresponds to the random access preamble. Further, wireless device 121 or processing circuitry therein is configured to, or may comprise the determining unit 812 configured to, determine an identity of the wireless device 121, MsgB RNTI, as the sum of the first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion. In some embodiments, the wireless device 121 or processing circuitry therein may be configured to, or may comprise the receiving unit 813 configured to, in response to the transmitted message on PUSCH, receive a message, MsgB, identified by the determined identity of the wireless device 121, MsgB RNTI.

According to some embodiments, the offset may be determined as a modulo division of the index associated with any of the first OFDM symbol, the frequency resource, and the time slot, that identifies the random access occasion of the transmitted random access preamble by a positive integer divisor. In this case, according to some embodiments, the positive integer divisor may be received by the wireless device 121 using higher layer signalling and may at most be 14. Alternatively, according to some embodiments, the positive integer divisor may be determined as at least one of a duration of the random access preamble in symbols minus 1 and a number of symbols in a time slot in which the random access preamble is transmitted minus 1. According to another option, the positive integer divisor may be determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA}>0$, then the divisor is equal to $N_{dur}^{RA}-1$ and otherwise if $N_{dur}^{RA}=0$ then the divisor is equal to 13. According to another further option, the positive integer divisor may be determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum.

Furthermore, in some embodiments, an additional term is added in the sum, wherein the additional term has a value of either 32,768 or 32,769. Also, in some embodiments, the wireless device 121 may comprise a power supply circuitry configured to supply power to the second wireless device 122.

Figure 9:
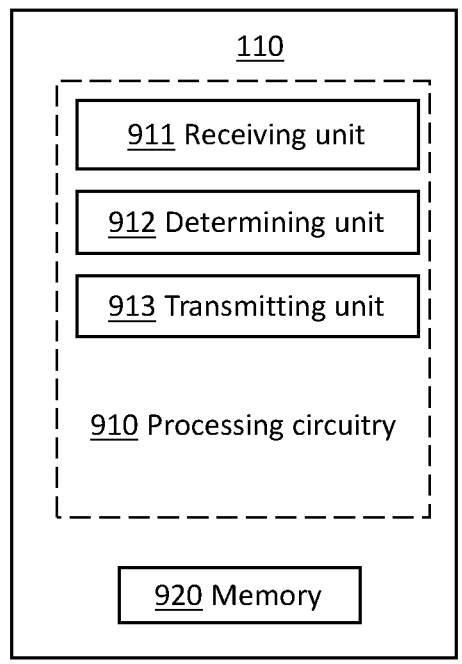
FIG. 9 is a block diagram depicting embodiments of a network node.

To perform the method actions in a network node 110 for determining an identity of a wireless device 121, MsgB RNTI, in a wireless communications network 100 during a random access procedure, the network node 110 may comprise the following arrangement depicted in FIG. 9. FIG. 9 shows a schematic block diagram of embodiments of a virtual apparatus 910 that may be implemented in network node 110.

FIG. 9 illustrates a schematic block diagram of embodiments of an apparatus 910 in a wireless communications network 100 (for example, the wireless network shown in FIG. 5 or FIG. 10). The apparatus 910 may be implemented in a base station or network node 110 (e.g. the network node QQ160 shown in FIG. 10). Apparatus 910 is operable to carry out the example method described with reference to FIG. 7, and possibly any other processes or methods disclosed herein. It is also to be understood that the method of FIG. 7 is not necessarily carried out solely by apparatus 910. At least some operations of the method can be performed by one or more other entities.

Apparatus 910, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 911, a determining unit 912, and a transmitting unit 913, and any other suitable units of apparatus 910 to perform corresponding functions according one or more embodiments of the present disclosure.

The network node 110 or processing circuitry therein is configured to, or may comprise the receiving unit 911 configured to, receive a random access preamble on a Random Access Channel, RACH, at a random access occasion, wherein the time/frequency resources of the random access occasion are identified by at least an index of a first OFDM symbol, an index of a frequency resource, and an index of a first time slot. Also, the network node 110 or processing circuitry therein is configured to, or may comprise the receiving unit 911 configured to, receive a message on a Physical Uplink Shared Channel, PUSCH, that corresponds to the random access preamble. Further, the network node 110 or processing circuitry therein is configured to, or may comprise the determining unit 912 configured to, determine an identity of the wireless device 121, MsgB RNTI, as the sum of the first identity, RA-RNTI, and an offset that is an integer greater than 1, wherein the first identity, RA-RNTI, is based on a sum comprising terms corresponding to at least the index of a first OFDM symbol, the index of a frequency resource, and the index of a first time slot that identifies the time/frequency resources of the random access occasion. In some embodiments, the network node 110 or processing circuitry therein is configured to, or may comprise the transmitting unit 913 configured to, in response to the received message on PUSCH, transmit a message, MsgB, identified by the determined identity of the wireless device 121, MsgB RNTI.

According to some embodiments, the offset may be determined as a modulo division of the index associated with any of the first OFDM symbol, the frequency resource, and the time slot, that identifies the random access occasion of the transmitted random access preamble by a positive integer divisor. In this case, according to some embodiments, the positive integer divisor may be received by the wireless device 121 using higher layer signalling and may at most be 14. Alternatively, according to some embodiments, the positive integer divisor may be determined as at least one of a duration of the random access preamble in symbols minus 1 and a number of symbols in a time slot in which the random access preamble is transmitted minus 1. According to another option, the positive integer divisor may be determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA}>0$, then the divisor is equal to $N_{dur}^{RA}-1$ and otherwise if $N_{dur}^{RA}=0$ then the divisor is equal to 13. According to another further option, the positive integer divisor may be determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum.

Furthermore, in some embodiments, an additional term is added in the sum, wherein the additional term has a value of either 32,768 or 32,769. Also, in some embodiments, the network node 110 may comprise a power supply circuitry configured to supply power to the second wireless device 122.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware. The term unit may also have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
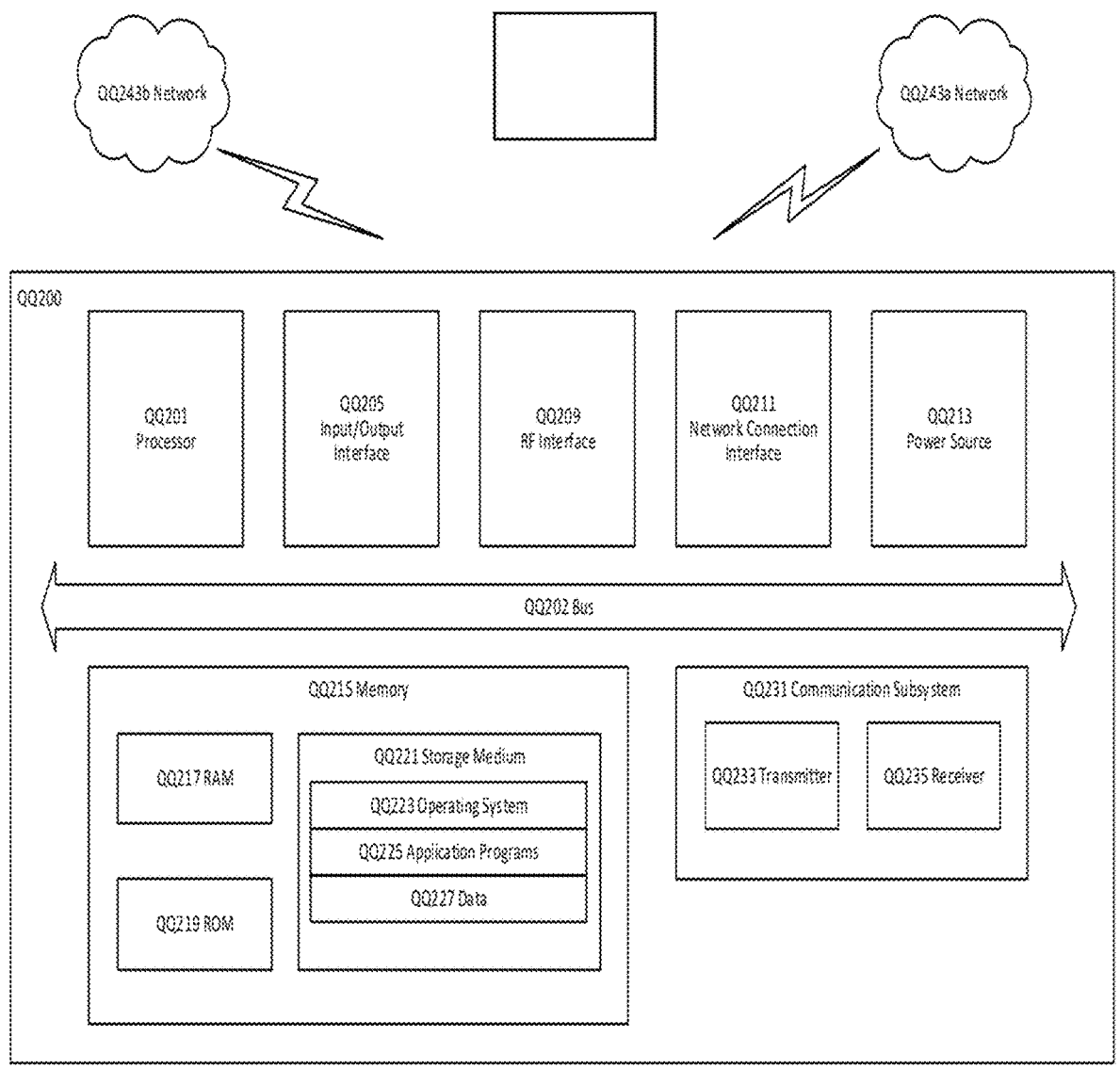
FIG. 11 is a schematic illustration of a user equipment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
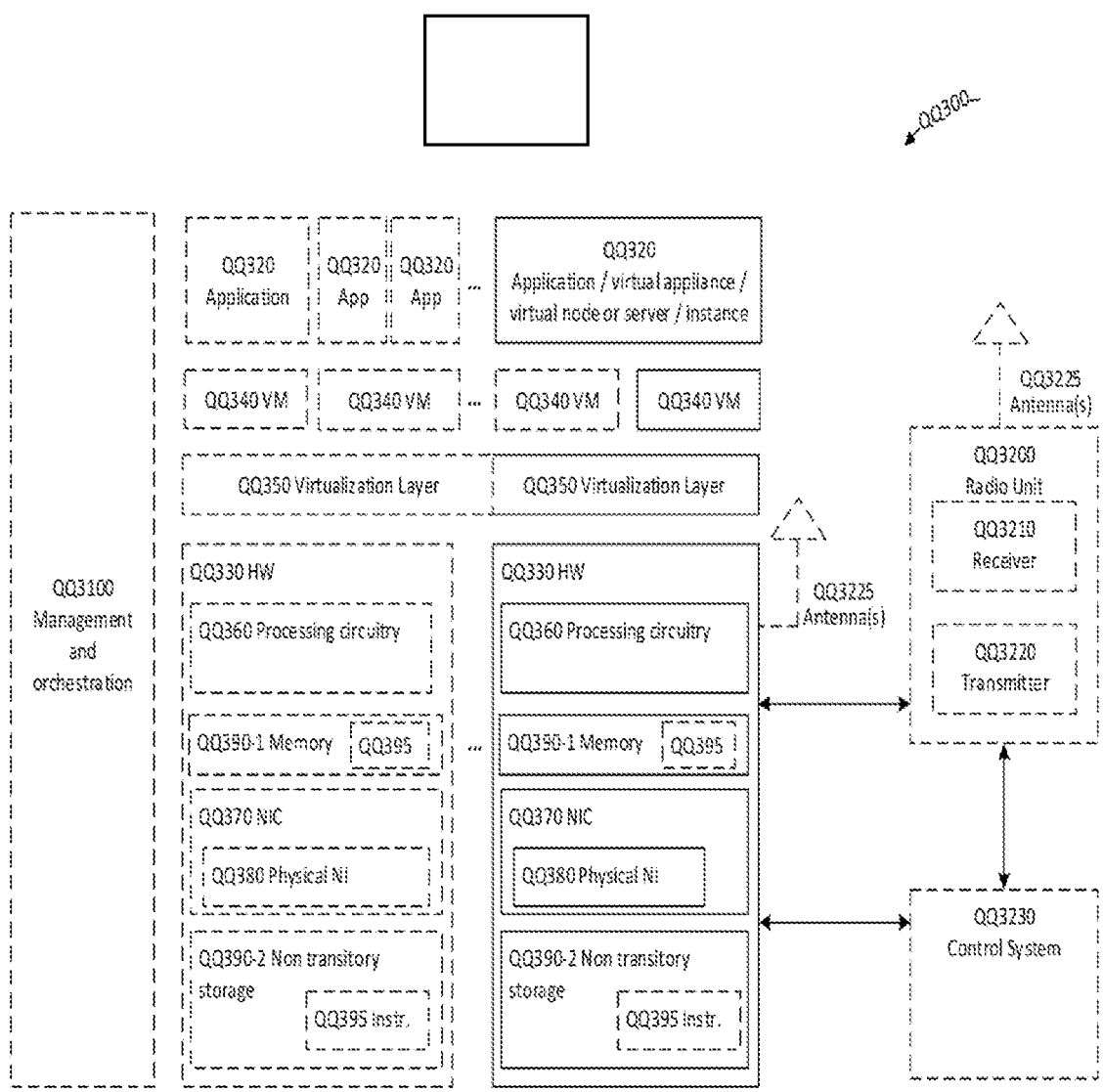
FIG. 12 is a schematic illustration of a virtualization environment in accordance with some embodiments, FIG. 13 schematically illustrates a telecommunication network connected via an intermediate network to a host computer.

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 13:
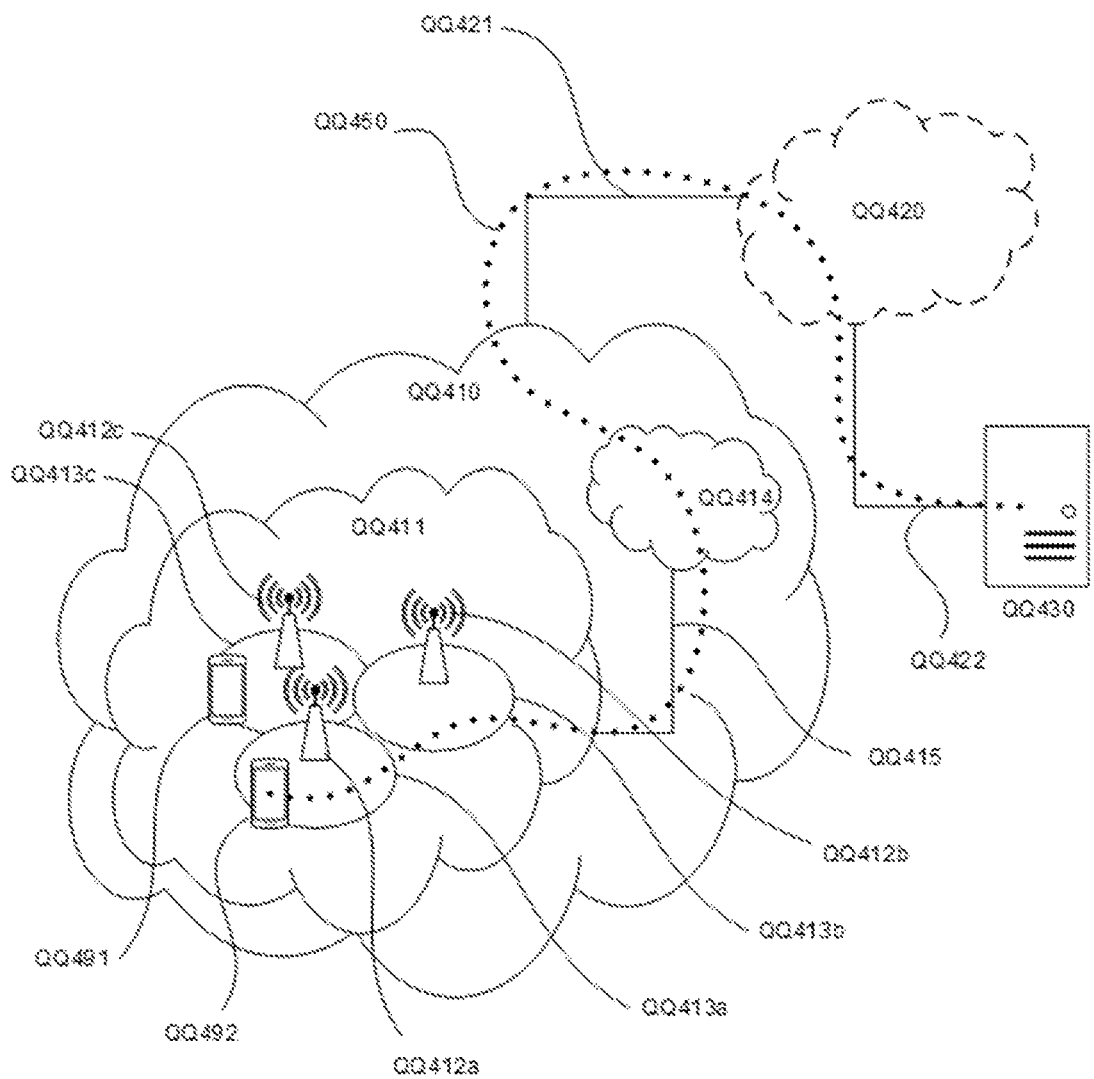

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides. It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

Figure 14:
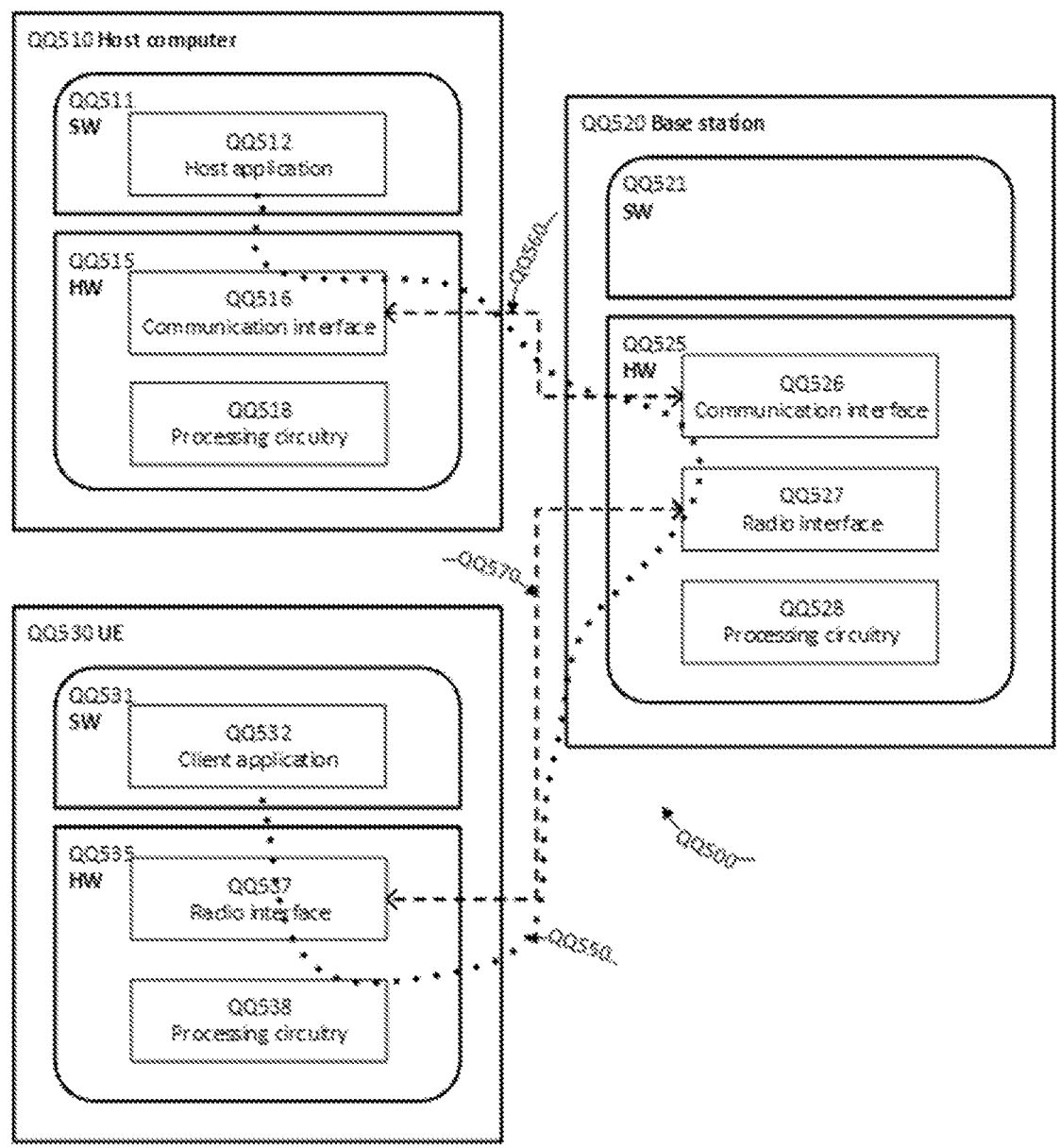
FIG. 14 is a generalized block diagram of a host computer communicating via a base station with a user equipment over a partially wireless connection.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency and thereby provide benefits such as reduced user waiting time and/or better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 15, 16:
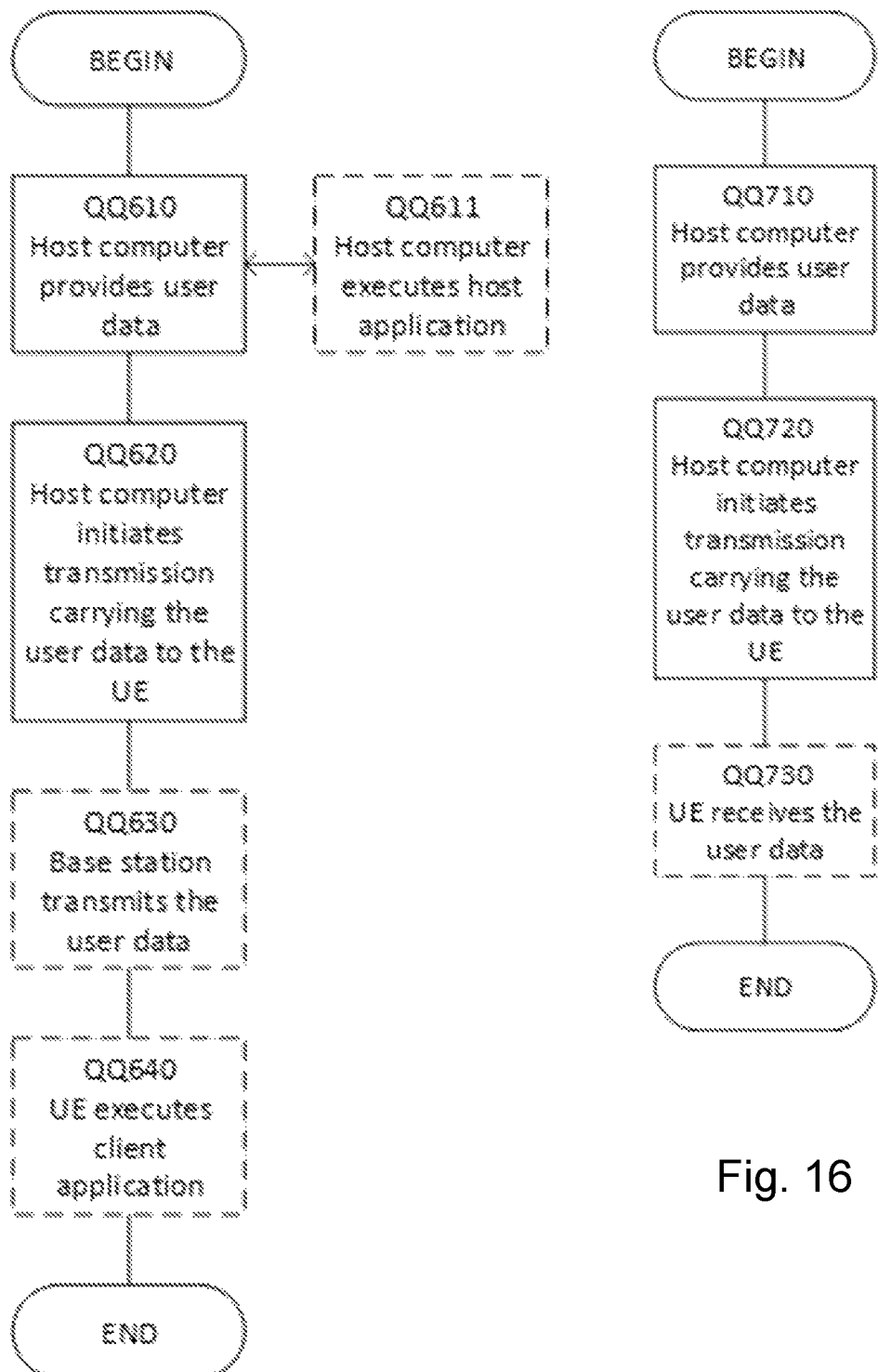
FIGS. 15-18 are flowcharts illustrating methods implemented in a communication system including a host computer, a base station and a user equipment.
Figures 17, 18:
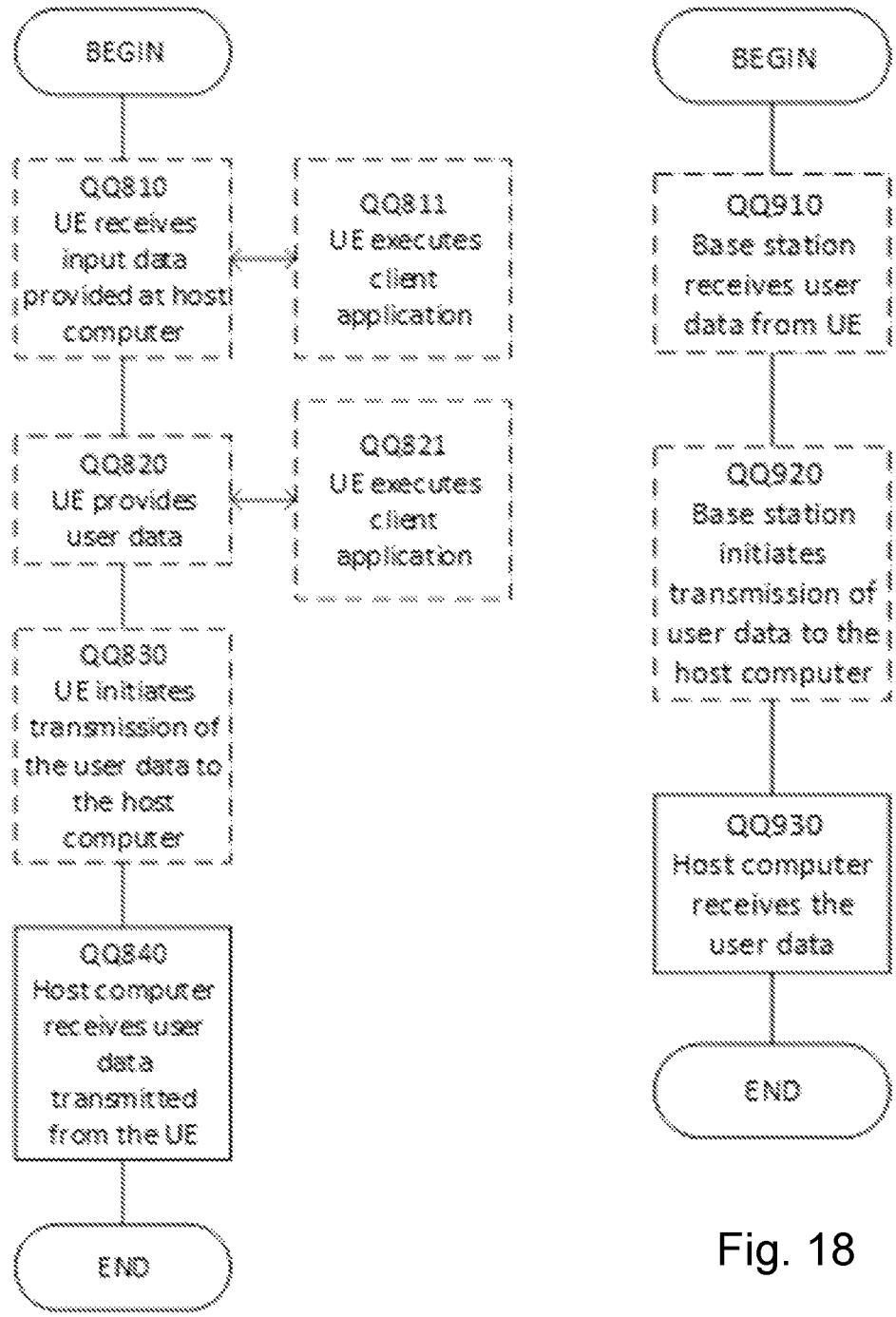

FIG. 15 is a flowchart illustrating a method implemented in a communication system, in accordance with one embodiment. The communication system includes a host computer, a base station and a UE which may be those described with reference to FIGS. 13 and 10. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 10. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 19, 20:
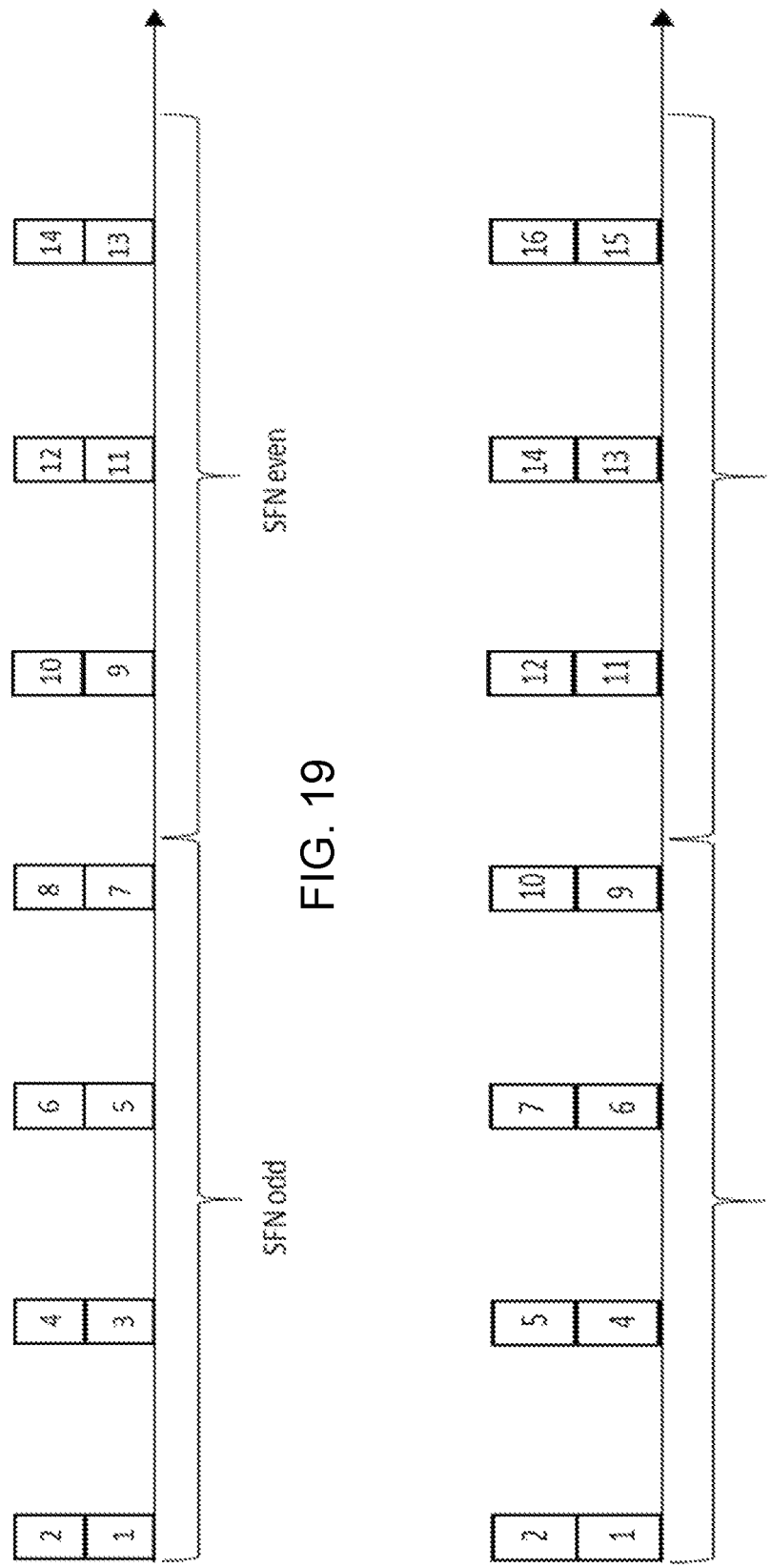
FIG. 19 is a schematic illustration of an example of a RACH occasion, RO, numbering for an MsgB Radio Network Temporary Identifier, RNTI.
FIG. 20 is a schematic illustration of an example of shifted MsgB RNTIs.

FIG. 19 is a flowchart illustrating a method implemented in a communication system, in accordance with one embodiment. The communication system includes a host computer, a base station and a UE which may be those described with reference to FIGS. 13 and 10. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 13 and 10. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Further Aspects of Some Embodiments

According to some embodiments, a user equipment (UE) for determining an identity of the wireless device, MsgB RNTI, in a wireless communications network during a random access procedure is provided. The UE may comprise: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the method described in FIG. 6; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE. According to some embodiments, a communication system including a host computer is provided. The communication system comprises: processing circuitry configured to provide user data; and a communication interface configured to forward the user data to a cellular network for transmission to at least one user equipment (UE), wherein the cellular network comprises a base station having a radio interface and processing circuitry, the base station's processing circuitry configured to perform any of the steps of the methods described with reference to FIG. 7. This communication system may further include the base station. Also, the communication system may further including at least one UE, wherein the at least one UE is configured to communicate with the base station. Further, in the communication system, the processing circuitry of the host computer may be configured to execute a host application, thereby providing the user data; and the at least one UE may comprise processing circuitry configured to execute a client application associated with the host application. According to another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the base station performs any of the steps of the methods described with reference to FIG. 7 above. The method may comprise, at the base station, transmitting the user data. Further, in the method, the user data may be provided at the host computer by executing a host application. Additionally, the method may further comprise, at the UE, executing a client application associated with the host application. According to a further embodiment, a user equipment (UE) configured to communicate with a base station is provided. The UE may comprise a radio interface and processing circuitry configured to perform the method as described with reference to FIG. 6. According to yet a further embodiment, a communication system including a host computer is provided. The communication system comprise processing circuitry configured to provide user data, and a communication interface configured to forward user data to a cellular network for transmission to a user equipment (UE), wherein the UE comprises a radio interface and processing circuitry, the UE's components configured to perform any of the steps of any of the methods described with reference to FIG. 6. In the communication system, the cellular network may further include a base station configured to communicate with the UE. In some embodiments, the processing circuitry of the host computer may be configured to execute a host application, thereby providing the user data; and the UE's processing circuitry may be configured to execute a client application associated with the host application. According to yet another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the UE performs any of the steps of the methods described with reference to FIG. 6 above. The method may comprise, at the UE, receiving the user data from the base station. According to yet another embodiment, a communication system including a host computer is provided. The communication system comprises a communication interface configured to receive user data originating from a transmission from a user equipment (UE) to a base station, wherein the UE comprises a radio interface and processing circuitry, the UE's processing circuitry configured to perform any of the steps of the methods described with reference to FIG. 6 above. The communication system may also include the UE. Also, the communication system may include the base station, wherein the base station comprises a radio interface configured to communicate with the UE and a communication interface configured to forward to the host computer the user data carried by a transmission from the UE to the base station. In some embodiments, the processing circuitry of the host computer may be configured to execute a host application; and the UE's processing circuitry may be configured to execute a client application associated with the host application, thereby providing the user data. In some embodiments, the processing circuitry of the host computer is configured to execute a host application, thereby providing request data; and the UE's processing circuitry is configured to execute a client application associated with the host application, thereby providing the user data in response to the request data. According to yet another embodiment, a method implemented in a communication system including a host computer, a base station and a user equipment (UE) is provided. The method may comprise: at the host computer, receiving user data transmitted to the base station from the UE, wherein the UE performs any of the steps of the methods described with reference to FIG. 6 above. In some embodiments, the method may comprise, at the UE, providing the user data to the base station. In some embodiments, the method may comprise, at the UE, executing a client application, thereby providing the user data to be transmitted; and, at the host computer, executing a host application associated with the client application. In some embodiments, the method may comprise, at the UE, executing a client application; and at the UE, receiving input data to the client application, the input data being provided at the host computer by executing a host application associated with the client application, wherein the user data to be transmitted is provided by the client application in response to the input data. According to yet another embodiment, a communication system including a host computer comprising a communication interface configured to receive user data originating from a transmission from a user equipment (UE) to a base station is provided, wherein the base station comprises a radio interface and processing circuitry, the base station's processing circuitry configured to perform any of the steps of the methods described with reference to FIG. 7 above. In some embodiments, the communications system further includes the base station. In some embodiments, the communications system further includes the UE, wherein the UE is configured to communicate with the base station. In some embodiments, the processing circuitry of the host computer is configured to execute a host application; and the UE is configured to execute a client application associated with the host application, thereby providing the user data to be received by the host computer. According to yet another embodiment, a method implemented in a communication system including a host computer, a base station and a user equipment (UE) is provided. The method may comprise: at the host computer, receiving, from the base station, user data originating from a transmission which the base station has received from the UE, wherein the UE performs any of the steps of the methods described with reference to FIG. 6 above. In some embodiments, the method may comprise at the base station, receiving the user data from the UE. some embodiments, the method may comprise at the base station, initiating a transmission of the received user data to the host computer. The embodiments herein are not limited to the above described preferred embodiments. Various alternatives, modifications and equivalents may be used. Therefore, the above embodiments should not be construed as limiting.

Yet Further Aspects According to Some Embodiments

According to some embodiments, some further methods to determine the RNTI used for MsgB for UEs using a 2-STEP RACH procedure are provided.

There are, proposed below herein, various embodiments which address one or more of the issues disclosed herein. Certain embodiments may provide one or more of the following technical advantages. Some of the embodiments herein facilitates the use of RNTIs for MsgB that are less than 17920, and so avoid reducing the number of RNTIs that are desirable for C-RNTI and other slowly changing RNTIs. Another advantage is that the MsgB RNTI design enables 2-step RACH operation where more than one PDCCH the schedules a MsgB that corresponds to one RO can be scheduled in a slot, thereby reducing the latency of UEs using the same RO.

According to some embodiments herein, there is provided a method performed by a wireless device for determining an identity of the wireless device, MsgB RNTI, in a wireless communications network during a random access procedure. In this case, the method begins in a first step with transmitting a random access preamble on a Random Access Channel, RACH, at a random access occasion, wherein the random access occasion is identified by at least a first OFDM symbol, a frequency resource, and a time slot, in which the random access preamble is transmitted. In a second step, the method here transmits a message on a Physical Uplink Shared Channel, PUSCH, that corresponds to the random access preamble. Further, in a third step, the method here determines an identity of the wireless device, MsgB RNTI, based on a sum comprising terms corresponding to at least the first OFDM symbol, the frequency resource, and the time slot, that identifies the random access occasion of the transmitted random access preamble, wherein the sum comprises an offset associated with at least one of the terms that is an integer greater than 1. According to some embodiments, the method here further comprises receiving a message, MsgB, intended for the wireless device identified by the determined identity of the wireless device, MsgB RNTI, in a fourth step. Further, the at least one term to which the offset is associated may comprise an index associated with the first OFDM symbol, and wherein the offset is determined as a modulo division of an index that identifies the random access preamble by a positive integer divisor. According to some embodiments, the positive integer divisor is received by the wireless device using higher layer signalling and is at most 14. According to some embodiments, the positive integer divisor is determined as at least one of a duration of the random access preamble in symbols minus 1 and a number of symbols in a time slot in which the random access preamble is transmitted minus 1. According to some embodiments, the positive integer divisor is determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA} > 0$, then the divisor is equal to $N_{dur}^{RA} - 1$ and otherwise if $N_{dur}^{RA} = 0$ then the divisor is equal to 13.

According to some embodiments, the positive integer divisor is determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA} > 0$, then the divisor is equal to $N_{dur}^{RA}$ and otherwise if $N_{dur}^{RA} = 0$ then the divisor is equal to 14, and a constant greater than 17,920 is added to the sum. According to some embodiments, the identity of the wireless device, MsgB RNTI, based on a sum determined as: (s_id+ p_offset)+14×(t_id)+14×80×(f_id), wherein s_id is an index corresponding to the first OFDM symbol, t_id is an index corresponding to the time slot, f_id is an index corresponding to the frequency resource, and p_offset is the offset. According to some embodiments, the identity of the wireless device, MsgB RNTI, is based on a sum determined as: (s_id+p_offset)+14×(t_id+t_offset)+14×80×(f_id+f_offset), wherein s_id is an index corresponding to the first OFDM symbol, t_id is an index corresponding to the time slot, f_id is an index corresponding to the frequency resource, and at least one of the p_offset, t_offset and f_offset is an offset being an integer greater than 1 when used, or when not used, are set to 0 or excluded from the sum. Further, an additional term may be added to the sum, wherein the additional term has a value of either 32,768 or 32,769. The method may further comprise providing user data and forwarding the user data to a host computer via the transmission to the base station.

In this case, another virtual apparatus may be implemented in a wireless device for determining an identity of the wireless device, MsgB RNTI, in a wireless communications network during a random access procedure. FIG. 8 illustrates a schematic block diagram of an apparatus 810 in a wireless network (for example, the wireless network shown in FIG. 10). The apparatus may be implemented in a wireless device or network node (e.g., wireless device QQ110 or network node QQ160 shown in FIG. 10). Apparatus 810 is operable to carry out the example method described in the embodiments above and possibly any other processes or methods disclosed herein. It is also to be understood that the method described in the embodiments above is not necessarily carried out solely by apparatus 810. At least some operations of the method can be performed by one or more other entities. Virtual Apparatus 810 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a transmitting unit 811, a determining unit 812, and any other suitable units of apparatus 810 to perform corresponding functions according one or more embodiments of the present disclosure. As illustrated in FIG. 8, apparatus 810 may include a transmitting unit 811, and a determining unit 812. The transmitting unit 811 is here configured to transmit a random access preamble on a Random Access Channel, RACH, at a random access occasion, wherein the random access occasion is identified by at least a first OFDM symbol, a frequency resource, and a time slot, in which the random access preamble is transmitted. The transmitting unit 811 is here also configured to transmit a message on a Physical Uplink Shared Channel, PUSCH, that corresponds to the random access preamble. The determining unit 812 is here configured to determining an identity of the wireless device, MsgB RNTI, based on a sum comprising terms corresponding to at least the first OFDM symbol, the frequency resource, and the time slot, that identifies the random access occasion of the transmitted random access preamble, wherein the sum comprises an offset associated with at least one of the terms that is an integer greater than 1.

According to some embodiments herein, there is provided a method performed by a wireless device for determining an identity of the wireless device, MsgB RNTI, in a wireless communications network during a random access procedure. The method begins at a first step with receiving a random access configuration indicating that random access occasions in a frame are numbered incrementally from an initial non-zero integer, e.g. 1. In a second step, the method transmits a random access preamble on a Random Access Channel, RACH, at a random access occasion according to the random access configuration. In a third step, the method transmits a message on a Physical Uplink Shared Channel, PUSCH, that corresponds to the random access preamble. In a fourth step, the method determines an identity of the wireless device, MsgB RNTI, that is the same as the number of the random access occasion in which the preamble is transmitted. According to some embodiments, the method may further comprise, receiving a message, MsgB, intended for the wireless device identified by the determined identity of the wireless device, MsgB RNTI, in a fifth step. According to some embodiments, the method may further comprise, further comprising replacing or skipping over a number of the random access occasions when determining an identity of the wireless device, MsgB RNTI, when the number of the random access occasion in which the preamble is transmitted is the same as an identity determined based on a sum comprising terms corresponding to at least a first OFDM symbol, a frequency resource, and a time slot, that identifies the random access occasion of the transmitted random access preamble. The method may further comprise providing user data and forwarding the user data to a host computer via the transmission to the base station.

In this case, another virtual apparatus may be implemented in a wireless device for determining an identity of the wireless device, MsgB RNTI, in a wireless communications network during a random access procedure. FIG. 8 illustrates a schematic block diagram of an apparatus 810 in a wireless network (for example, the wireless network shown in FIG. 10). The apparatus may be implemented in a wireless device or network node (e.g., wireless device QQ110 or network node QQ160 shown in FIG. 10). Apparatus 810 is operable to carry out the example method described in the embodiments above and possibly any other processes or methods disclosed herein. It is also to be understood that the method described in the embodiments above is not necessarily carried out solely by apparatus 810. At least some operations of the method can be performed by one or more other entities. Virtual Apparatus 810 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a transmitting unit 811, a determining unit 812, and a receiving unit 813, and any other suitable units of apparatus 810 to perform corresponding functions according one or more embodiments of the present disclosure. As illustrated in FIG. 8, apparatus 810 may include a transmitting unit 811, and a determining unit 812, and a receiving unit 813. The receiving unit 813 may here be configured to receive a random access configuration indicating that random access occasions in a frame are numbered incrementally from an initial non-zero integer, e.g. 1. The transmitting unit 811 may here be configured to transmit a random access preamble on a Random Access Channel, RACH, at a random access occasion according to the random access configuration. The transmitting unit 811 may here also be configured to transmit a message on a Physical Uplink Shared Channel, PUSCH, that corresponds to the random access preamble. The determining unit 812 is here configured to determine an identity of the wireless device, MsgB RNTI, that is the same as the number of the random access occasion in which the preamble is transmitted.

According to some embodiments herein, there is provided a method performed by a wireless device for determining an identity of the wireless device, MsgB RNTI, in a wireless communications network during a random access procedure. The method begins at a first step with receiving a PUSCH configuration. Further, in a second step, the method receives a first random access preamble configuration identifying random access preambles that are associated with the PUSCH configuration. Further, in a third step, the method transmits a random access preamble on a Random Access Channel, RACH, at a random access occasion, wherein the random access occasion is configured by the first random access preamble configuration and identified by at least a first OFDM symbol, a frequency resource, and a time slot, in which the random access preamble is transmitted. In a fourth step, the method determines an identity of the wireless device, MsgB RNTI, according to a first identity procedure in case a second random access preamble configuration that identifies preambles that are not associated with the received PUSCH configuration is received. In a fifth step, the method determines an identity of the wireless device, MsgB RNTI, according to a second identity procedure in case a second random access preamble configuration that identifies preambles that are not associated with the received PUSCH configuration is not received. According to some embodiments, the method may further comprise the a further step of receiving a message, MsgB, intended for the wireless device identified by the determined identity of the wireless device, MsgB RNTI. According to some embodiments, the first identity procedure comprises determining an identity of the wireless device, MsgB RNTI, based on a sum comprising terms corresponding to the at least first OFDM symbol, the frequency resource, and the time slot, that identifies the random access occasion of the transmitted random access preamble. According to some embodiments, the second identity procedure comprises determining an identity of the wireless device, MsgB RNTI, based on a sum comprising terms corresponding to the at least first OFDM symbol, the frequency resource, and the time slot, that identifies the random access occasion of the transmitted random access preamble, wherein the sum comprises an offset associated with at least one of the terms that is an integer greater than 1. The method may further comprise providing user data and forwarding the user data to a host computer via the transmission to the base station.

In this case, another virtual apparatus may be implemented in a wireless device for determining an identity of the wireless device, MsgB RNTI, in a wireless communications network during a random access procedure. FIG. 8 illustrates a schematic block diagram of an apparatus 810 in a wireless network (for example, the wireless network shown in FIG. 10). The apparatus may be implemented in a wireless device or network node (e.g., wireless device QQ110 or network node QQ160 shown in FIG. 10). Apparatus 810 is operable to carry out the example method described in the embodiments above and possibly any other processes or methods disclosed herein. It is also to be understood that the method described in the embodiments above is not necessarily carried out solely by apparatus 810. At least some operations of the method can be performed by one or more other entities. Virtual Apparatus 810 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a transmitting unit 811, a determining unit 812, and a receiving unit 813, and any other suitable units of apparatus 810 to perform corresponding functions according one or more embodiments of the present disclosure. As illustrated in FIG. 8, apparatus 810 may include a transmitting unit 811, and a determining unit 812, and a receiving unit 813. The receiving unit 813 may here be configured to receive a PUSCH configuration. The receiving unit 813 may here also be configured to receive a first random access preamble configuration identifying random access preambles that are associated with the PUSCH configuration. The transmitting unit 811 may here be configured to transmit a random access preamble on a Random Access Channel, RACH, at a random access occasion, wherein the random access occasion is configured by the first random access preamble configuration and identified by at least a first OFDM symbol, a frequency resource, and a time slot, in which the random access preamble is transmitted. The determining unit 812 may here be configured to determine an identity of the wireless device, MsgB RNTI, according to a first identity procedure in case a second random access preamble configuration that identifies preambles that are not associated with the received PUSCH configuration is received. The determining unit 812 may here also be configured to determine an identity of the wireless device, MsgB RNTI, according to a second identity procedure in case a second random access preamble configuration that identifies preambles that are not associated with the received PUSCH configuration is not received.

According to some embodiments herein, there is provided a method performed by a base station for determining an identity of a wireless device, MsgB RNTI, in a wireless communications network during a random access procedure. The method begins at a first step with receiving a random access preamble on a Random Access Channel, RACH, at a random access occasion, wherein the random access occasion is identified by at least a first OFDM symbol, a frequency resource, and a time slot, in which the random access preamble is transmitted. In a second step, the method receives a message on a Physical Uplink Shared Channel, PUSCH, that corresponds to the random access preamble. In a third step, the method determining an identity of the wireless device, MsgB RNTI, based on a sum comprising terms corresponding to at least the first OFDM symbol, the frequency resource, and the time slot, that identifies the random access occasion of the transmitted random access preamble, wherein the sum comprises an offset associated with at least one of the terms that is an integer greater than 1. According to some embodiments, the method may further comprise transmitting a message, MsgB, intended for the wireless device identified by the determined identity of the wireless device, MsgB RNTI, in a fourth step. According to some embodiments, the at least one term to which the offset is associated comprises an index associated with the first OFDM symbol, and wherein the offset is determined as a modulo division of an index that identifies the random access preamble by a positive integer divisor. According to some embodiments, the positive integer divisor is received by the wireless device using higher layer signalling and is at most 14. According to some embodiments, the positive integer divisor is determined as at least one of a duration of the random access preamble in symbols minus 1 and a number of symbols in a time slot in which the random access preamble is transmitted minus 1. According to some embodiments, the positive integer divisor is determined according to the parameter $N_{dur}^{RA}$ of the configuration of the random access preamble from Table 6.3.3.2-1, 6.3.3.2-1, or 6.3.3.2-3 of the standard document 3GPP TS 38.211, where if $N_{dur}^{RA}>0$, then the divisor is equal to $N_{dur}^{RA}-1$ and otherwise if $N_{dur}^{RA}=0$ then the divisor is equal to 13. According to some embodiments, the positive integer divisor is determined according to the parameter $N_{dur}^{RA}$ of the configuration of the random access preamble from Table 6.3.3.2-2, 6.3.3.2-3, or 6.3.3.2-4 of the standard documents 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum. According to some embodiments, the identity of the wireless device, MsgB RNTI, based on a sum determined as: (s_id+p_offset)+14×(t_id)+14×80×(f_id), wherein, s_id is an index corresponding to the first OFDM symbol, t_id is an index corresponding to the time slot, f_id is an index corresponding to the frequency resource, and p_offset is the offset. According to some embodiments, the identity of the wireless device, MsgB RNTI, based on a sum determined as: (s_id+p_offset)+14×(t_id+t_offset)+14×80×(f_id+f_offset), wherein, s_id is an index corresponding to the first OFDM symbol, t_id is an index corresponding to the time slot, f_id is an index corresponding to the frequency resource, and at least one of the p_offset, t_offset and f_offset is an offset being an integer greater than 1 when used, or when not used, are set to 0 or excluded from the sum. According to some embodiments, an additional term is added in the sum, wherein the additional term has a value of either 32,768 or 32,769. The method may further comprise, obtaining user data; and forwarding the user data to a host computer or a wireless device.

In this case, another virtual apparatus may be implemented in a wireless device for determining an identity of the wireless device, MsgB RNTI, in a wireless communications network during a random access procedure. FIG. 9 illustrates a schematic block diagram of an apparatus 910 in a wireless network (for example, the wireless network shown in FIG. 10). The apparatus may be implemented in a wireless device or network node (e.g., wireless device QQ110 or network node QQ160 shown in FIG. 10). Apparatus 910 is operable to carry out the example method described in the embodiments above and possibly any other processes or methods disclosed herein. It is also to be understood that the method described in the embodiments above is not necessarily carried out solely by apparatus 910. At least some operations of the method can be performed by one or more other entities. Virtual Apparatus 910 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 911, a determining unit 912, and a transmitting unit 913, and any other suitable units of apparatus 910 to perform corresponding functions according one or more embodiments of the present disclosure. As illustrated in FIG. 9, apparatus 910 may include a receiving unit 911, a determining unit 912, and a transmitting unit 913. The receiving unit 911 may here be configured to receive a random access preamble on a Random Access Channel, RACH, at a random access occasion, wherein the random access occasion is identified by at least a first OFDM symbol, a frequency resource, and a time slot, in which the random access preamble is transmitted. The receiving unit 911 may here also be configured to receive a message on a Physical Uplink Shared Channel, PUSCH, that corresponds to the random access preamble. The determining unit 912 may here be configured to determine an identity of the wireless device, MsgB RNTI, based on a sum comprising terms corresponding to at least the first OFDM symbol, the frequency resource, and the time slot, that identifies the random access occasion of the transmitted random access preamble, wherein the sum comprises an offset associated with at least one of the terms that is an integer greater than 1.

According to some embodiments herein, there is provided a method performed by a base station for determining an identity of a wireless device, MsgB RNTI, in a wireless communications network during a random access procedure. The method begins at a first step with receiving a random access configuration indicating that random access occasions in a frame are numbered incrementally from an initial non-zero integer, e.g. 1. In a second step, the method transmits a random access preamble on a Random Access Channel, RACH, at a random access occasion according to the random access configuration. In a third step, the method transmits a message on a Physical Uplink Shared Channel, PUSCH, that corresponds to the random access preamble. In fourth step, the method determines an identity of the wireless device, MsgB RNTI, that is the same as the number of the random access occasion in which the preamble is transmitted. According to some embodiments, the method may further comprise: receiving a message, MsgB, intended for the wireless device identified by the determined identity of the wireless device, MsgB RNTI, in a fifth step. According to some embodiments, the method may further comprise replacing or skipping over a number of the random access occasions when determining an identity of the wireless device, MsgB RNTI, when the number of the random access occasion in which the preamble is transmitted is the same as an identity determined based on a sum comprising terms corresponding to at least a first OFDM symbol, a frequency resource, and a time slot, that identifies the random access occasion of the transmitted random access preamble. According to some embodiments, the method may further comprise obtaining user data; and forwarding the user data to a host computer or a wireless device.

In this case, another virtual apparatus may be implemented in a wireless device for determining an identity of the wireless device, MsgB RNTI, in a wireless communications network during a random access procedure. FIG. 9 illustrates a schematic block diagram of an apparatus 910 in a wireless network (for example, the wireless network shown in FIG. 10). The apparatus may be implemented in a wireless device or network node (e.g., wireless device QQ110 or network node QQ160 shown in FIG. 10). Apparatus 910 is operable to carry out the example method described in the embodiments above and possibly any other processes or methods disclosed herein. It is also to be understood that the method described in the embodiments above is not necessarily carried out solely by apparatus 910. At least some operations of the method can be performed by one or more other entities. Virtual Apparatus 910 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 911, a determining unit 912, and a transmitting unit 913, and any other suitable units of apparatus 910 to perform corresponding functions according one or more embodiments of the present disclosure. As illustrated in FIG. 9, apparatus 910 may include a receiving unit 911, a determining unit 912, and a transmitting unit 913. The receiving unit 911 may here be configured to receive a random access configuration indicating that random access occasions in a frame are numbered incrementally from an initial non-zero integer, e.g. 1. The transmitting unit 913 may here be configured to transmitting a random access preamble on a Random Access Channel, RACH, at a random access occasion according to the random access configuration. The transmitting unit 913 may here also be configured to transmit a message on a Physical Uplink Shared Channel, PUSCH, that corresponds to the random access preamble. The determining unit 912 may here be configured to determine an identity of the wireless device, MsgB RNTI, that is the same as the number of the random access occasion in which the preamble is transmitted.

According to some embodiments herein, there is provided a method performed by a base station for determining an identity of a wireless device, MsgB RNTI, in a wireless communications network during a random access procedure. The method begins at a first step with transmitting a PUSCH configuration. In a second step, the method transmits a first random access preamble configuration identifying random access preambles that are associated with the PUSCH configuration In a third step, the method, receives a random access preamble on a Random Access Channel, RACH, at a random access occasion, wherein the random access occasion is configured by the first random access preamble configuration and identified by at least a first OFDM symbol, a frequency resource, and a time slot, in which the random access preamble is transmitted. In a fourth step, the method determines an identity of the wireless device, MsgB RNTI, according to a first identity procedure in case a second random access preamble configuration that identifies preambles that are not associated with the received PUSCH configuration is transmitted by the base station. In a fifth step, the method may determine an identity of the wireless device, MsgB RNTI, according to a second identity procedure in case a second random access preamble configuration that identifies preambles that are not associated with the received PUSCH configuration is not transmitted by the base station. According to some embodiments, the method may further comprise, transmitting a message, MsgB, intended for the wireless device identified by the determined identity of the wireless device, MsgB RNTI, in a sixth step. According to some embodiments, the first identity procedure comprises determining an identity of the wireless device, MsgB RNTI, based on a sum comprising terms corresponding to the at least first OFDM symbol, the frequency resource, and the time slot, that identifies the random access occasion of the transmitted random access preamble. According to some embodiments, the second identity procedure comprises determining an identity of the wireless device, MsgB RNTI, based on a sum comprising terms corresponding to the at least first OFDM symbol, the frequency resource, and the time slot, that identifies the random access occasion of the transmitted random access preamble, wherein the sum comprises an offset associated with at least one of the terms that is an integer greater than 1. According to some embodiments, the method may further comprise, obtaining user data; and forwarding the user data to a host computer or a wireless device.

In this case, another virtual apparatus may be implemented in a wireless device for determining an identity of the wireless device, MsgB RNTI, in a wireless communications network during a random access procedure. FIG. 9 illustrates a schematic block diagram of an apparatus 910 in a wireless network (for example, the wireless network shown in FIG. 10). The apparatus may be implemented in a wireless device or network node (e.g., wireless device QQ110 or network node QQ160 shown in FIG. 10). Apparatus 910 is operable to carry out the example method described in the embodiments above and possibly any other processes or methods disclosed herein. It is also to be understood that the method described in the embodiments above is not necessarily carried out solely by apparatus 910. At least some operations of the method can be performed by one or more other entities. Virtual Apparatus 910 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 911, a determining unit 912, and a transmitting unit 913, and any other suitable units of apparatus 910 to perform corresponding functions according one or more embodiments of the present disclosure. As illustrated in FIG. 9, apparatus 910 may include a receiving unit 911, a determining unit 912, and a transmitting unit 913. The transmitting unit 913 may be configured to transmit a PUSCH configuration. The transmitting unit 913 may also be configured to transmit a first random access preamble configuration identifying random access preambles that are associated with the PUSCH configuration. The receiving unit 911 may be configured to receive a random access preamble on a Random Access Channel, RACH, at a random access occasion, wherein the random access occasion is configured by the first random access preamble configuration and identified by at least a first OFDM symbol, a frequency resource, and a time slot, in which the random access preamble is transmitted. The determining unit 912 may be configured to determine an identity of the wireless device, MsgB RNTI, according to a first identity procedure in case a second random access preamble configuration that identifies preambles that are not associated with the received PUSCH configuration is transmitted by the base station. The determining unit 912 may also be configured to determine an identity of the wireless device, MsgB RNTI, according to a second identity procedure in case a second random access preamble configuration that identifies preambles that are not associated with the received PUSCH configuration is not transmitted by the base station.

It should also be noted that the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Offset Based Mechanisms

In Rel-15, the RNTI used for identifying the random access response to the transmission of a PRACH is calculated as follows:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion ($0 \leq s\_id < 14$), t_id is the index of the first slot of the PRACH occasion in a system frame ($0 \leq t\_id < 80$), f_id is the index of the PRACH occasion in the frequency domain ($0 \leq f\_id < 8$), and ul_carrier_id is the UL carrier used for Random Access Preamble transmission (0 for NUL carrier, and 1 for SUL carrier). Further, it may be desirable to assign RNTIs for slowly changing RNTI types that are always different from those attainable by RA-RNTI, and so it may be desirable to avoid use RNTI values for MsgB with values above 17,920.

It may be observed that PRACH formats defined in Rel-15 are always at least two symbols long. Formats 0, 1, 2, and 3 are more than 12 symbols long and have a starting symbol of 0, and so an s_id equal to zero. Furthermore, only those PRACH formats based on sequences length 139 (i.e. 'short' formats A1-A3, B1, B4, C0, C2, A1/B1, A2/B2, and A3/B3) start on an odd symbol, such that s_id can be an odd number, and these sequences have lengths that are an integer multiple of 2.

Therefore, since the terms other than those with s_id (that is, those with t_id, f_id, and ul_carrier_id) are multiples of 2 in the RA-RNTI equation and a constant offset of 1 is used, RA-RNTI for formats 0-3 will always be an odd number, and the RA-RNTI for the short formats will either be an even or an odd number according to whether s_id is even or odd. If s_id is replaced in the RA-RNTI equation with (s_id+1), then formats 0-3 would always be even, and a short format that starts with an even symbol would be even instead of odd, whereas a short format that starts with an odd symbol would be odd even instead of even. Therefore, if MsgB RNTI may be determined according to:

$$\text{MsgB RNTI} = 1 + (s\_id+1) + 14 \times t\_id + 14 \times 80 \times f\_id + 14 \times 80 \times 8 \times ul\_carrier\_id$$

Or equivalently:

$$\text{MsgB RNTI} = 2 + s\_id + 14 \times t\_id + 14 \times 80 \times f\_id + 14 \times 80 \times 8 \times ul\_carrier\_id$$

Or equivalently:

$$\text{MsgB RNTI} = \text{RA-RNTI} + 1$$

MsgB will then use different RNTI values from RA-RNTI. These MsgB RNTI values will be less than 17,920 and so will not use the values greater than 17,920 that are desirable to assign to slowly changing RNTIs such as C-RNTI.

According to some embodiments, it may be desirable in some scenarios to allow more than one MsgB RNTI value to correspond to a RACH occasion. Using multiple different PDSCH transmissions each carrying one MsgB allows for example different MCS and frequency domain resource allocations, thereby allowing the network to adapt the MsgB PDSCH transmissions to the channel conditions experienced by the different UEs receiving the MsgBs, thereby improving spectral efficiency. Embodiments supporting different RNTIs for multiple MsgB transmissions for one RACH occasion may be constructed by associating the preamble used by a UE in the RO to the RNTI. One simple approach is to add the index of the preamble used for transmission to the Rel-15 RA-RNTI formula. However, since up to 64 different preambles can be associated with an RO and used for contention based operation, this would essentially multiply the number of ROs used by 64, which may leave few RNTIs available for other purposes. Therefore, in an embodiment, an offset is added to the Rel-15 RA-RNTI, where a modulo division is first applied to the index of the preamble used for transmission in the RACH occasion, where the modulo division is by a predetermined positive integer divisor. The divisor may be indicated to the UE by higher layer signaling. This embodiment may alternatively be expressed as:

$$\text{MsgB RNTI} = 1 + (s\_id + p\_offset) + 14 \times t\_id + 14 \times 80 \times f\_id + 14 \times 80 \times 8 \times ul\_carrier\_i = \text{RA RNTI} + p\_offset$$

wherein
  p_offset=preamble_id mod N_offset
  preamble_id is an index identifying the random access preamble
  N_offset is the predetermined positive integer divisor
  x mod y is the modulo division of x by y, as described in the standard document 3GPP TS 38.201 Annex A It may be beneficial to use RNTI values less than 17,920 for MsgB RNTI. If p_offset is larger than the number of OFDM symbols occupied by the PRACH preamble, then according to some embodiments for MsgB RNTI immediately above will lead to an RNTI that should correspond to an earlier RACH occasion to correspond to a later RACH occasion, leading to ambiguous values of RNTI. Therefore, some embodiments that use RNTI values less than 17,920 should further be constrained according to the number of symbols used by the random access preamble. Since the maximum number of symbols in a slot is 14, in some embodiments where the predetermined positive integer divisor is indicated by higher layer signaling, the signaling can indicate a maximum value of 14 for the divisor.

According to some embodiments, the network could select a value of N_offset that is less than the number of symbols used by the random access preamble. However, according to some embodiments, it may be desirable to avoid higher layer signaling of N_offset, for example to reduce signaling overhead or reduce testing complexity by allowing fewer overall configurations. Therefore, according to some embodiments, the UE determines the value of N_offset according to the number of symbols occupied by the random access preamble. This number of symbols can be determined for random access preamble formats that are less than 14 symbols long from the parameter $N_{dur}^{RA}$ in PRACH configuration Tables 6.3.3.2-2, 6.3.3.2-3, or 6.3.3.2-4 of 3GPP TS 38.211. For random access preamble formats 0, 1, 2, and 3, the value of $N_{dur}^{RA}$ is zero. In these formats, the preamble occupies all symbols of a slot, and so up to 14 different symbol offset values can be associated with the random access preamble without introducing ambiguity in the RA-RNTI with respect to different slot numbers. Therefore, the value of N_offset can be based on 14 symbols. According to some embodiments, the UE calculates N_offset according to the RACH occasion configuration can therefore be where if $N_{dur}^{RA} > 0$, then N_offset=$N_{dur}^{RA}-1$ and otherwise if $N_{dur}^{RA}=0$ then N_offset=13. However, sometimes it may be desirable to limit the number of assigned preamble-dependent MsgB RNTIs. Therefore, according to some embodiments, the UE calculates N_offset as the minimum of $N_{dur}^{RA}-1$ and a maximum N_offset value, N_offset_max, i.e. N_offset=MIN($N_{dur}^{RA}-1$, N_offset_max), when $N_{dur}^{RA} > 0$ and N_offset=N_offset_max, when $N_{dur}^{RA}=0$ In these calculations N_offset_max is a value satisfying 0<N_offset_max<14. It may be observed that $N_{dur}^{RA}$ is always a multiple of 2 when $N_{dur}^{RA} > 0$, and so the modulo division will not divide by zero in this embodiment.

According to some embodiments, it may be desirable to associate two RNTIs to a RACH occasion containing preambles that are two symbols long. According to some embodiments, N_offset may be equal to 2. This may lead to ambiguity with RA-RNTI values, and so a method to avoid this ambiguity is needed. If an integer value greater than 17,920 is added to the calculation of MsgB RNTI above, then there will be no common values for MsgB and RA-RNTI. Therefore, according to some embodiments the UE calculates N_offset according to the RACH occasion configuration where if $N_{dur}^{RA} > 0$, then N_offset=$N_{dur}^{RA}$ and otherwise if $N_{dur}^{RA}=0$ then N_offset=14, and the UE adds an integer value of greater than 17,920 to p_offset.

A second observation of the RA-RNTI equation is that if the RACH configuration is such that t_id does not attain all values of 0 to 79, or if f_id does not attain all values of 0 to 7, then there are RA-RNTI values in the range of 0 . . . 17920 that are not attained. MsgB may be assigned to some or all of these unused values by offsetting one or both of the t_id and f_id terms by predetermined non-zero integer values that are signaled to the UE. The MsgB RNTIs may then be calculated according to one or more of the following, according to whether it is desirable to use unused RNTIs associated with the time domain, the frequency domain, or both the time domain and frequency domain, respectively.

MsgB RNTI=1+$s\_id$+14×($t\_id$+$t\_$offset)+14×80× $f\_id$+14×80×8×$ul\_carrier\_id$ MsgB RNTI=1+$s\_id$+14×$t\_id$+14×80×($f\_id$+$f\_$offset)+14×80×8×$ul\_carrier\_id$ MsgB RNTI=1+$s\_id$+14×($t\_id$+$t\_$offset)+14×80× ($f\_id$+$f\_$offset)+14×80×8×$ul\_carrier\_id$ where t_offset is a value greater than 0 and less than 80, and f_offset is a value greater than 0 and less than 8.

According to some embodiments, an offset of 1 may further be added to MsgB RNTI calculations that have offsets added to the time, frequency, or both the time and frequency terms. This exploits the behavior of RA-RNTI that has either an even set or odd set of values for a given RACH configuration, as described above, in addition to occupying the subset of time- or frequency-related RNTI values.

According to some embodiments, one or more of the time offset value t_offset and f_offset are signaled to the UE in higher layer signaling such as RRC signaling.

According to some embodiments, an additional offset may be added to MsgB calculations based on the MsgB window length, especially if a MsgA response can be expected across frame borders and where the time instances of when an RAR may need to be received spans over more than one Radio Frame. As a result, an additional parameter for the MsgB RNTI calculation is determined by the MsgB window length, explicitly by configuration or implicitly, so that the resulting MsgB RNTI is additionally determined by the number of frames encompassed by the MsgB window. This is exemplified, for example, by:

MsgB RNTI=RA-RNTI+offset×$F$(0≤$F$≤frames in MsgB window)

Compressed Numbering Mechanisms

According to some embodiments, the ROs of the configured 2-step configuration (as given by a prach-ConfigurationIndex and msg1-FDM for 2-step RA) in a frame are numbered consecutively starting from 1 (i.e. all integers, 1, 2, 3, ..., maximum number of ROs) to give a MsgB RNTI. The numbering may be done per SFN, per a number of SFNs (allowing uniqueness over the number of SFNs where the numbering is done to enable longer MsgB windows), per PRACH configuration period or any other configured length. The ROs corresponding to these numbers are then assigned consecutive RNTIs, starting at a certain lowest RNTI, e.g. RNTI=1, in the order of the number series. Another way to describe this allocation process is that a set of consecutive RNTIs (starting at a certain RNTI, e.g. RNTI=1), consisting of a number of RNTIs that is equal to the number of numbered ROs, are given the same consecutive numbering as the numbered ROs. Then each of the numbered RNTIs is assigned to the RO with the same number. This results in that a sequence of RNTIs are assigned to the numbered ROs.

If any of the MsgB RNTIs in this sequence collides with an RA-RNTI generated by the used prach-ConfigurationIndex and msg1-FDM that is configured for 4-step RA in the cell, this MsgB RNTI are removed from the set of MsgB RNTIs and replaced by a non-colliding RNTI.

The replacement of colliding numbers may be performed by:

1. Shifting the MsgB RNTI values so that if MsgB RNTI=k (where k is the RO number and RNTI number) collides with a used RA-RNTI, this colliding MsgB RNTI takes the value k+1. This applies to all MsgB RNTIs>k.
2. Replacement may also be done by using numbers larger than the maximum number of ROs in the 2-step RA configuration. This means that if the sequence of MsgB RNTI numbers is 1, 2, 3, ..., N, and MsgB RNTI k1, k2, k3 collide with used RA-RNTIs, k1 is replaced by N+1, k2 by N+2 and k3 by N+3 (assuming these do not collide).

According to some embodiments, the 2-step configuration of ROs may be numbered sequentially from 1 to 14 over two SFNs (the exemplified PRACH configuration repeats every SFN and the numbering is over two SFNs to enable longer MsgB window due to the uniqueness of RNTIs over 20 ms). This is illustrated in FIG. 19.

Further, in another step, the possible RA-RNTIs from the configured prach-ConfigurationIndex and msg1-FDM for the 4-step RA configuration may be computed. According to some embodiments, assume RA-RNTI={3, 8, 18, ..., k}. This means that there is collisions for MsgB RNTI=3 (where "MsgB RNTI=3" is a simplified notation for "MsgB RNTI number 3" or "MsgB RNTI corresponding to RO number 3") and MsgB RNTI=8. Here, "MsgB RNTI=3" is a simplified notation for "MsgB RNTI number 3" or "MsgB RNTI corresponding to RO number 3". Hence, "MsgB RNTI=3" does not mean that the MsgB RNTI actually has the value 3. These MsgB RNTIs may be skipped and the MsgB RNTI allocation is shifted to give the following allocation: MsgB RNTI={1, 2, 4, 5, 6, 7, 9, 10, 11, 13, 14, 15, 16}. This is illustrated in FIG. 20.

In FIG. 20, it is shown that initially allocated MsgB RNTIs (i.e. MsgB RNTI allocations in the first step of the allocation process) may be shifted to remove the colliding values 3 and 8.

The numbering of ROs for the MsgB RNTIs may be done in a corresponding procedure as SSB are mapped to ROs. SSB may be mapped to ROs by first in increasing order of frequency resource indexes for frequency multiplexed PRACH occasions, secondly in increasing order of time resource indexes for time multiplexed PRACH occasions within a PRACH slot, and third in increasing order of indexes for PRACH slots.

However, other ordering is also possible.

Figure 21:
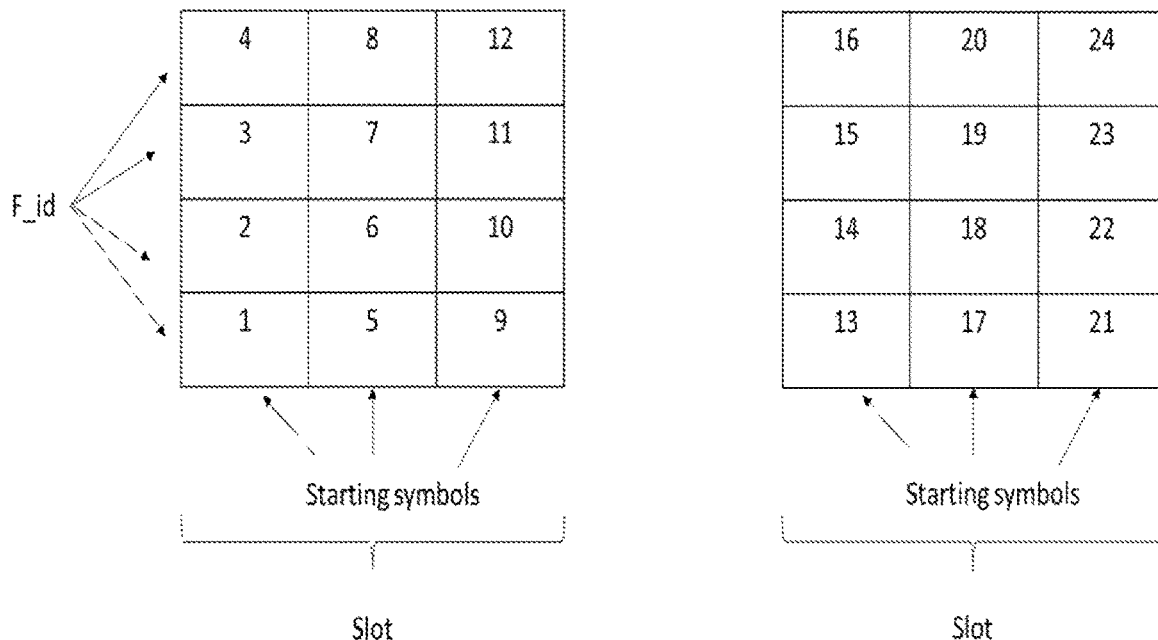
FIG. 21 is a schematic illustration of an example of a RACH occasion, RO, numbering in two slots.
Figure 22:
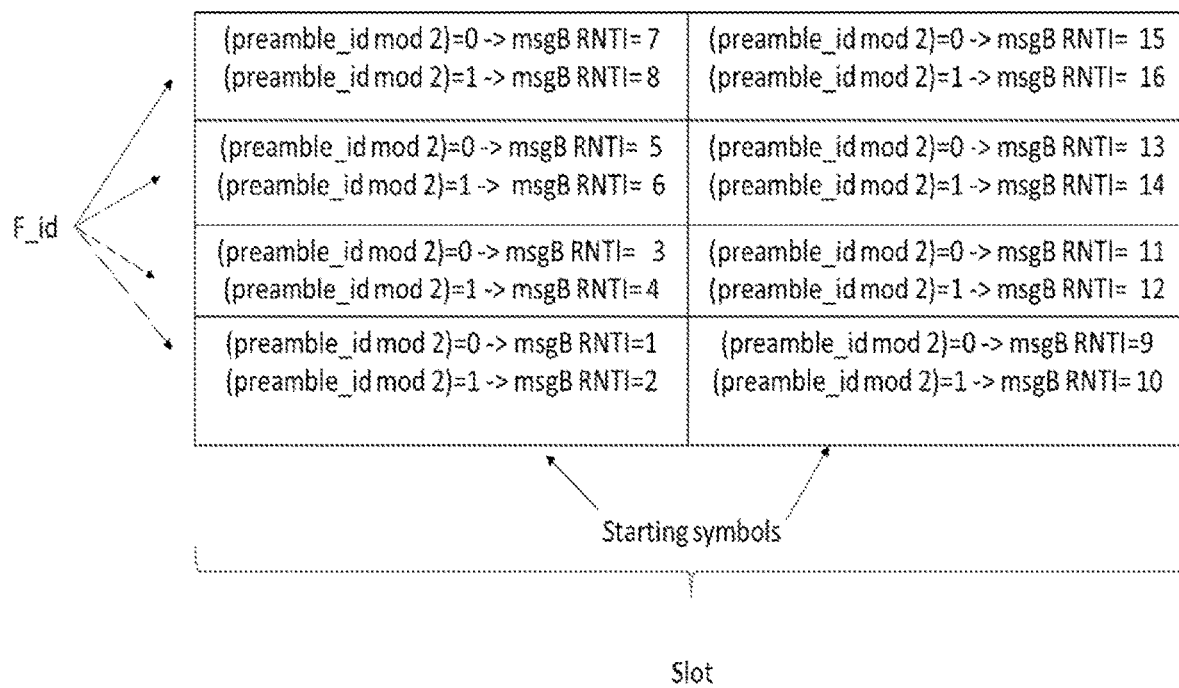
FIG. 22 is a schematic illustration of an example of a MsgB RNTI generation.

FIG. 21 illustrates RO numbering in two slots, 3 starting symbols and frequency multiplexing of 4. Further, the MsgB RNTI allocation may include a numbering where preamble indexes are incorporated. For a given RO, the p_offset=preamble_id mod N_offset is added to the MsgB RNTI numbering. Also here the numbering of ROs for the MsgB RNTI may according to some embodiments be done in the similar way as SSB are mapped to ROs by first in increasing order of p_offset=preamble_id mod N_offset indexes within a single PRACH occasion, secondly in increasing order of frequency resource indexes for frequency multiplexed PRACH occasions, third in increasing order of time resource indexes for time multiplexed PRACH occasions within a PRACH slot, and fourth in increasing order of indexes for PRACH slots FIG. 22 illustrates MsgB RNTIs where N_offset=2 according to some embodiments. As disclosed in FIG. 6, the MsgB RNTI numbering starts in the RO in the first frequency, first symbol and first slot. If the UE transmits a preamble where (preamble_id mod 2)=0, the resulting MsgB RNTI is 1 in the first RO, while if the UE transmits a preamble where (preamble_id mod 2)=1, the resulting MsgB RNTI is 2 in the first RO. This is repeated for the other ROs to generate MsgB RNTIs for all ROs and preamble ids.

According to some embodiments, the optional division of preambles into preamble groups, e.g. preamble group A and B (more preamble groups are not excluded) is taken into account in the preamble-dependent MsgB RNTI allocation. Such preamble group division may be performed to associate different MsgA PUSCH sizes (and thus differently sized PUSCH resource allocations or different MCSs resulting in different effective MsgA PUSCH sizes), typically also associated with a pathloss threshold. A by-product of such preamble group division may be that regular network-triggered fallback to 4-step RA cannot (or will not) be performed for preambles in a certain group, e.g. due to its MsgB PUSCH resource allocation size. It is also possible that a preamble group is configured with the explicit property that fallback to 4-step RA should not be used for this preamble group.

In cases where the MsgA preamble reception succeeds at the gNB, but the gNB fails to receive MsgA PUSCH, the gNB's action should thus be to respond with a fallback-RAR for preambles from preamble groups for which fallback to 4-step RA is allowed, while the action should be not to respond at all (or respond with a back-off indication) to preambles from a preamble group for which fallback to 4-step RA is not allowed. Therefore, it may be preferable to avoid that preambles for which fallback to 4-step RA is allowed and preambles for which fallback to 4-step RA is not allowed are not allocated the same MsgB RNTI. There may also be other reasons for such separation, e.g. a future introduction of different MsgB formats depending on the preamble group (or the property associated with the preamble group). To ensure such separation, the preamble groups could be taken into account in the RO numbering. To this end, the preamble groups could be given preamble group indexes/identities, e.g. g_id, which could have the form of consecutive numbers, i.e. 0, 1, 2 . . . (one number associated with each preamble group). This preamble group index could form an additional level in the RO numbering. For instance, ROs may be given consecutive numbers in an order according to first in increasing order of p_offset=preamble_id mod N_offset indexes for the preambles in one preamble group within a single PRACH occasion, secondly in increasing order of frequency resource indexes for frequency multiplexed PRACH occasions, third in increasing order of time resource indexes for time multiplexed PRACH occasions within a PRACH slot, fourth in increasing order of indexes for PRACH slots, and fifth in increasing order of preamble group indexes.

According to some embodiments, the separation principle may have separate numbering series for preambles of different preamble groups. The allocation of such different series of numbered ROs+preambles may be assigned RNTIs (to serve as MsgB RNTIs) starting at different (lowest) starting RNTIs, where the respective starting RNTIs are separated with a large enough offset to ensure a gap of zero or more RNTIs between the MsgB RNTI series allocated to respective preamble groups.

According to some embodiments, multiple preamble groups sharing a certain common property may be included in the same number series, while one or more preamble groups with a different certain property may be included in a separate number series.

Operation with Differently Configured 2 Step and 4 Step RACH Occasions

When RACH occasions are configured such that RACH occasions for 2-step operation and for 4 step operation occupy different RACH resources (where RACH resources can include the RACH occasion in time or frequency or carrier), then if the Rel-15 RA-RNTI calculation is used for both (4-step) RA-RNTIs and MsgB RNTIs, the RNTIs will be different for the 2-step RA and 4-step RA preambles. According to some embodiments, it is only necessary to calculate a MsgB RNTI that is different from the RA-RNTI when shared 2-step and 4-step RACH occasions are configured. Therefore, according to some embodiments, the Rel-15 RA-RNTI calculation from section 5.1.3 of the standard document 3GPP TS 38.321 is used to determine the value of the RNTI for MsgB when 2-step RACH and 4-step RACH resources are configured differently, i.e. when separate ROs are configured for 2-step RA and 4-step RA.

In deployments where the separation of 2-step ROs and 4-step ROs is done by frequency-multiplexing 2-step ROs and 4-step ROs, these 2-step ROs may receive the same f_id as the 4-step ROs they are frequency-multiplexed with and since all the other parameters in the Rel-15 RA-RNTI calculation formula are the same for these ROs, their resulting RNTIs will collide (i.e. MsgB RNTIs will collide with 4-step RA-RNTIs). In such deployments, the colliding MsgB RNTIs may be replaced with other RNTIs. According to some embodiments, a colliding MsgB RNTI may be replaced by the lowest greater non-colliding RNTI. According to some embodiments a colliding MsgB RNTI is replaced by a non-colliding RNTI above 17920, e.g. the first unoccupied RNTI above 17920, or by adding a fixed offset to the colliding MsgB RNTI, e.g. an offset equal to 17920.

Another way to handle deployments with 2-step ROs frequency-multiplexed with 4-step ROs may be that one of the above-described embodiments for derivation of MsgB RNTIs different from 4-step RA-RNTIs may be used for these deployments.

According to some embodiments, it is possible that 2-step RACH may be configured on a bandwidth part that does not have 4-step RACH configured. These cases are similar to the separately configured cases mentioned above, since there is no opportunity for ambiguity between MsgB RNTI and RA-RNTI. Therefore, according to some embodiments, the Rel-15 RA-RNTI calculation from section 5.1.3 of the standard document 3GPP TS 38.321 is used to determine the value of the RNTI for MsgB when only 2-step RACH resources are configured on a bandwidth part.

According to some embodiments, a MsgB RNTI may be calculated from a modified RA-RNTI equation and is offset from RA-RNTI by greater than one. This may be described as a method in a UE of identifying the UE in a random access procedure, comprising: transmitting a random access preamble in a random access occasion, the random access occasion being identified by a first symbol, a frequency resource, and a slot in which the random access preamble was transmitted; transmitting a physical uplink shared channel, PUSCH, that corresponds to the random access preamble; and calculating a radio network temporary identifier, RNTI, used to identify at least the random access preamble as a sum of at least a first, second, and third term, each term corresponding to only one of the first symbol, frequency resource, and slot, wherein at least one of the terms comprises an offset, the offset being an integer greater than one that is added to the term.

According to some embodiments, a MsgB RNTI is calculated from Rel-15 RA-RNTI equation plus an offset greater than one. This may be described as a method in a method in a UE of identifying the UE in a random access procedure, comprising: transmitting a random access preamble in a random access occasion, the random access occasion being identified by a first symbol, a frequency resource, and a slot in which the random access preamble was transmitted; transmitting a physical uplink shared channel, PUSCH, that corresponds to the random access preamble; calculating a first radio network temporary identifier, RNTI, as a sum of at least a first, second, and third term, each term corresponding to only one of the first symbol, frequency resource, and slot; and calculating a second RNTI used to identify the preamble as a sum of the first RNTI and an offset, the offset being a non-zero positive integer greater than one.

In some embodiments, the offset from RA-RNTI may be a symbol offset. This means, for example, that calculating the sum of the at least first, second, and third terms comprises calculating (s_id+p_offset)+14×t_id+14×80×f_id, where s_id is an index identifying the first symbol, t_id is an index identifying the slot, f_id is an index identifying the frequency resource, and p_offset is an integer greater than one.

In some embodiments, the offset is a modulo function of the index of the transmitted PRACH. This means, for example, that a term of the first, second, and third terms that comprises the offset contains an index identifying the first symbol and the offset is calculated as a modulo division of an index identifying the random access preamble by a positive integer divisor. In some embodiments, the range of the offset is configured. This means, for example, that the divisor may be signaled to the UE by higher layer signaling and is at most 14. In some embodiments, the offset is less than the length of the PRACH. This means, for example, that the divisor may be determined as at least one of a duration of the random access preamble in symbols minus one and a number of symbols in a slot in which the random access preamble is transmitted minus one. In some embodiments, the number of MsgB RNTIs for an RO is set according to PRACH configurations in 38.211. This means, for example, that the divisor may be calculated according to the parameter $N_{dur}^{RA}$ of the configuration of the random access preamble from Table 6.3.3.2-1, 6.3.3.2-1, or 6.3.3.2-3 of 3GPP TS 38.211 where if $N_{dur}^{RA}>0$, then the divisor is equal to $N_{dur}^{RA}-1$ and otherwise if $N_{dur}^{RA}=0$ then the divisor is equal to 13. In some embodiments, offsets may be by symbol, slot, and/or frequency. This means, for example, that calculating the sum of the at least first, second, and third terms that comprises calculating (s_id+p_offset)+14×(t_id+t_offset)+14×80×(f_id+f_offset), where s_id is an index identifying the first symbol, t_id is an index identifying the slot, f_id is an index identifying the frequency resource, and at least one of p_offset, t_offset, and f_offset is a non-zero integer value and otherwise zero. In some embodiments, MsgB uses the high half of the range of RNTI. This means, for example, that a fourth term may comprises a value of one of 32,768 and 32,769. In some embodiments, MsgB uses the high half of the range of RNTI and the number of MsgB RNTIs for an RO is set according to PRACH configurations in 38.211. This means, for example, that the divisor may be calculated according to the parameter $N_{dur}^{RA}$ of the configuration of the random access preamble from Table 6.3.3.2-2, 6.3.3.2-3, or 6.3.3.2-4 of 3GPP TS 38.211 where if $N_{dur}^{RA}>0$, then the divisor is equal to $N_{dur}^{RA}$ and otherwise if $N_{dur}^{RA}=0$ then the divisor is equal to 14, and a constant greater than 17,920 is added to the sum.

According to some embodiments, a UE may assign monotonically increasing integers to MsgB RNTI, excluding values that can be produced by Rel-15 RA-RNTI. This may be described as a method in a UE of identifying the UE in a random access procedure, comprising: receiving signaling identifying a random access configuration to be used in the random access procedure; setting an index k to an initial integer value greater than zero; setting an index i to correspond to an initial random access occasion; in a first step, if k is a value of RNTI that can be produced by RA-RNTI for the random access configuration, assigning a value of k to an RNTI that corresponds to a random access occasion with index i; in a second step, if k is not a value of RNTI that can be produced by RA-RNTI for the random access configuration, setting k to a next value of k and returning to the first step; in a third step, if all RACH occasions of a set of RACH occasions do not have an RNTI assigned, setting the index i to correspond to a next RACH occasion, setting k to a next value of k and returning to the first step; transmitting a random access preamble in a random access occasion according to the random access configuration; transmitting a physical uplink shared channel, PUSCH, that corresponds to the random access preamble. In some embodiments, RNTIs are consecutive unless they conflict with RA-RNTI. This means, for example, that setting k to a next value of k comprises setting k to k+1.

According to some embodiments, a RA-RNTI is used for MsgB when ROs are separately configured, otherwise an offset greater than one is added to a sum of symbol, frequency, and slot terms. This may be described as a method in a UE of identifying the UE in a random access procedure, comprising: receiving a PUSCH configuration associated to which random access preambles are mapped; receiving a first random access preamble configuration identifying preambles that are associated with the PUSCH configuration; transmitting a random access preamble in a random access occasion, the random access occasion being configured by the first random access preamble configuration and identified by a first symbol, a frequency resource, and a slot in which the random access preamble was transmitted; if a second random access preamble configuration identifying preambles that are not associated with the PUSCH configuration is received, calculating a first radio network temporary identifier, RNTI, as a sum of at least a first, second, and third term, each term corresponding to only one of the first symbol, frequency resource, and slot; and if a second random access preamble configuration identifying preambles that are not associated with the PUSCH configuration is not received, calculating a second radio network temporary identifier, RNTI, as a sum of an offset and at least a first, second, and third term, each term corresponding to only one of the first symbol, frequency resource, and slot, and the offset being a non-zero positive integer greater than one.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

CBRA Contention Based Random Access
CFRA Contention Free Random Access
MA Multiple Access
MsgA Message A
MsgB Message B NR New Radio
NW Network
PRACH Physical Random Access Channel
PUSCH Physical Uplink Shared Channel
RA Random Access
RACH Random Access Channel
RAR Random Access Response
RNTI Radio Network Temporary Identity
RO RACH Occasion
SI System Information
SIB1 System Information Block Type 1
TF Timing and Frequency
1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for determining an identity of the wireless device, MsgB RNTI, in a wireless communications network during a random access procedure, the identity of the wireless device being a Radio Network Temporary Identifier, RNTI, to be used for MessageB, MsgB, transmission of the random access procedure, an MsgB transmission being identifiable by the wireless device via the MsgB RNTI, the method comprising:
transmitting a random access preamble on a Random Access Channel, RACH, at a random access occasion, time/frequency resources of the random access occasion being identified by at least an index of a first Orthogonal Frequency Division Multiplexing, OFDM, symbol, an index of a frequency resource, and an index of a first time slot;
transmitting a message on a Physical Uplink Shared Channel, PUSCH, that corresponds to the random access preamble; and
determining the MsgB RNTI as a sum of a first identity and an offset that is an integer greater than 1, the first identity being a Random Access RNTI, RA-RNTI, and being based on a sum comprising terms corresponding to at least the index of the first OFDM symbol, the index of the frequency resource, and the index of the first time slot that identifies the time/frequency resources of the random access occasion, the offset being determined as a modulo division of the index associated with any of the first OFDM symbol, the frequency resource, and the time slot, that identifies the random access occasion of the transmitted random access preamble, by a positive integer divisor.

2. The method according to claim 1, further comprising:
in response to the transmitted message on PUSCH, receiving a message, MsgB, identified by the determined identity of the wireless device, MsgB RNTI.

3. The method according to claim 1, wherein the positive integer divisor is received by the wireless device using higher layer signalling and is at most 14.

4. The method according to claim 1, wherein the positive integer divisor is determined as at least one of a duration of the random access preamble in symbols minus 1 and a number of symbols in a time slot in which the random access preamble is transmitted minus 1.

5. The method according to claim 1, wherein an additional term is added in the sum, wherein the additional term has a value of either 32,768 or 32,769.

6. A wireless device for determining an identity of the wireless device, MsgB RNTI, in a wireless communications network during a random access procedure, the identity of the wireless device being a Radio Network Temporary Identifier, RNTI, to be used for MessageB, MsgB, transmission of the random access procedure, an MsgB transmission being identifiable by the wireless device via the MsgB RNTI, the wireless device comprising:
processing circuitry configured to:
transmit a random access preamble on a Random Access Channel, RACH, at a random access occasion, time/frequency resources of the random access occasion being identified by at least an index of a first Orthogonal Frequency Division Multiplexing, OFDM, symbol, an index of a frequency resource, and an index of a first time slot, transmit a message on a Physical Uplink Shared Channel, PUSCH, that corresponds to the random access preamble; and
determine the MsgB RNTI as the sum of the first identity and an offset that is an integer greater than 1, the first identity being a Random Access RNTI, RA-RNTI, and being based on a sum comprising terms corresponding to at least the index of the first OFDM symbol, the index of the frequency resource, and the index of the first time slot that identifies the time/frequency resources of the random access occasion, the offset being determined as a modulo division of the index associated with any of the first OFDM symbol, the frequency resource, and the time slot, that identifies the random access occasion of the transmitted random access preamble, by a positive integer divisor.

7. The wireless device according claim 6, wherein the processing circuitry is further configured to, in response to the transmitted message on PUSCH, receive a message, MsgB, identified by the determined identity of the wireless device, MsgB RNTI.

8. A method performed by a network node for determining an identity of a wireless device, MsgB RNTI, in a wireless communications network during a random access procedure, the identity of the wireless device being a Radio Network Temporary Identifier, RNTI, to be used for MessageB, MsgB, transmission of the random access procedure, an MsgB transmission being identifiable by the wireless device via the MsgB RNTI, the method comprising:
receiving a random access preamble on a Random Access Channel, RACH, at a random access occasion, time/frequency resources of the random access occasion being identified by at least an index of a first Orthogonal Frequency Division Multiplexing, OFDM, symbol, an index of a frequency resource, and an index of a first time slot;
receiving a message on a Physical Uplink Shared Channel, PUSCH, that corresponds to the random access preamble; and
determining the MsgB RNTI as the sum of the first identity and an offset that is an integer greater than 1, the first identity being a Random Access RNTI, RA-RNTI, and being based on a sum comprising terms corresponding to at least the index of the first OFDM symbol, the index of the frequency resource, and the index of the first time slot that identifies the time/frequency resources of the random access occasion, the offset being determined as a modulo division of the index associated with any of the first OFDM symbol, the frequency resource, and the time slot, that identifies the random access occasion of the transmitted random access preamble, by a positive integer divisor.

9. The method according to claim 8, further comprising:
in response to the received message on PUSCH, transmitting a message, MsgB, identified by the determined identity of the wireless device, MsgB RNTI.

10. The method according to claim 8, wherein the positive integer divisor is received by the wireless device using higher layer signalling and is at most 14.

11. The method according to claim 8, wherein the positive integer divisor is determined as at least one of a duration of the random access preamble in symbols minus 1 and a number of symbols in a time slot in which the random access preamble is transmitted minus 1.

12. The method according to claim 8, wherein an additional term is added in the sum, wherein the additional term has a value of either 32,768 or 32,769.

13. A network node for determining an identity of a wireless device, MsgB RNTI, in a wireless communications network during a random access procedure, the identity of the wireless device being a Radio Network Temporary Identifier, RNTI, to be used for MessageB, MsgB, transmission of the random access procedure, an MsgB transmission being identifiable by the wireless device via the MsgB RNTI, the network node comprising:

processing circuitry configured to:

receive a random access preamble on a Random Access Channel, RACH, at a random access occasion, time/frequency resources of the random access occasion being identified by at least an index of a first Orthogonal Frequency Division Multiplexing, OFDM, symbol, an index of a frequency resource, and an index of a first time slot;

receive a message on a Physical Uplink Shared Channel, PUSCH, that corresponds to the random access preamble; and determine the MsgB RNTI as the sum of the first identity and an offset that is an integer greater than 1, the first identity being a Random Access RNTI, RA-RNTI, and being based on a sum comprising terms corresponding to at least the index of the first OFDM symbol, the index of the frequency resource, and the index of the first time slot that identifies the time/frequency resources of the random access occasion, the offset being determined as a modulo division of the index associated with any of the first OFDM symbol, the frequency resource, and the time slot, that identifies the random access occasion of the transmitted random access preamble, by a positive integer divisor.

14. The network node according to claim 13, wherein the processing circuitry is further configured to, in response to the received message on PUSCH, transmit a message, MsgB, identified by the determined identity of the wireless device, MsgB RNTI.

* * * * *